US009279455B2

(12) United States Patent
Tokunaga

(10) Patent No.: US 9,279,455 B2
(45) Date of Patent: Mar. 8, 2016

(54) SLIDING COMPONENT

(71) Applicant: EAGLE INDUSTRY CO., LTD., Tokyo (JP)

(72) Inventor: Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/292,630

(22) Filed: May 30, 2014

(65) Prior Publication Data

US 2014/0294331 A1 Oct. 2, 2014

Related U.S. Application Data

(62) Division of application No. 13/702,056, filed as application No. PCT/JP2011/072921 on Oct. 5, 2011, now Pat. No. 8,814,433.

(30) Foreign Application Priority Data

Oct. 6, 2010 (JP) ................................ 2010-226949

(51) Int. Cl.

*F16C 33/74* (2006.01)
*F16C 17/04* (2006.01)
*F16C 32/06* (2006.01)
(Continued)

(52) U.S. Cl.

CPC ............... *F16C 33/74* (2013.01); *F16C 17/045* (2013.01); *F16C 17/047* (2013.01); *F16C 32/0633* (2013.01); *F16C 33/741* (2013.01); *F16J 15/3412* (2013.01); *F16J 15/40* (2013.01)

(58) Field of Classification Search

CPC .... F16C 17/045; F16C 17/047; F16C 33/741; F16C 33/74; F16C 32/0633; F16C 33/107; F16J 15/40; F16J 15/3412

USPC ........... 384/91, 123, 105, 107, 112, 120–120, 384/129–130, 138

See application file for complete search history.

(56) References Cited

U.S. PATENT DOCUMENTS 3,376,083 A * 4/1968 Muijderman ................ 384/123
3,870,382 A * 3/1975 Reinhoudt .................... 384/123
4,007,974 A * 2/1977 Huber .......................... 384/123

(Continued)

FOREIGN PATENT DOCUMENTS

CN 1060345 4/1992 ............... F16J 15/34
CN 2534428 2/2003 ............... F16J 15/40

(Continued)

OTHER PUBLICATIONS

Chinese Office Action (with translation) issued in related application No. 201180042852.1, dated Sep. 2, 2014 (8 pgs).

(Continued)

*Primary Examiner* — Marcus Charles
(74) *Attorney, Agent, or Firm* — Hayes Soloway P.C.

(57) ABSTRACT

A positive pressure generating mechanism comprising a positive pressure generating groove is provided to a high-pressure side of one of two sliding surfaces that slide relative to each other in a pair of sliding components, and a negative pressure generating mechanism comprising a negative pressure generating groove is provided to a low-pressure side. The positive pressure generating groove and negative pressure generating groove are communicated with a high-pressure fluid side and separated from a low-pressure fluid side by a seal surface.

10 Claims, 23 Drawing Sheets

HIGH-PRESSURE FLUID SIDE
1
7
3
2
4 (n−1)
4
6
COUNTERPART SLIDING SURFACE ROTATIONAL DIRECTION
7
8
5
LOW-PRESSURE FLUID SIDE
3 (n)
7
3
5
2
4
6
8
7
(a)
7
2
9
3 RAYLEIGH STEP MECHANISM
5
4
REVERSE RAYLEIGH STEP MECHANISM
8
11
7
(b)

(51) Int. Cl.
*F16J 15/40* (2006.01)
*F16J 15/34* (2006.01)

(56) References Cited

U.S. PATENT DOCUMENTS

| | | | | |
|---|---|---|---|---|
| 4,407,509 | A | 10/1983 | Etsion | 227/3 |
| 4,830,572 | A * | 5/1989 | Oklejas et al. | 415/110 |
| 5,071,141 | A | 12/1991 | Lai et al. | 277/65 |
| 5,092,612 | A | 3/1992 | Victor et al. | 277/400 |
| 6,036,435 | A * | 3/2000 | Oklejas | 415/111 |
| 6,152,452 | A | 11/2000 | Wang | 277/400 |
| 6,768,236 | B2 | 7/2004 | Tokunaga et al. | 310/90 |
| 7,044,470 | B2 | 5/2006 | Zheng | 277/400 |
| 7,258,346 | B2 | 8/2007 | Tejima | 227/399 |
| 7,377,518 | B2 | 5/2008 | Lai | 227/400 |
| 2001/0022870 | A1 | 9/2001 | Takahashi et al. | 384/121 |
| 2002/0014743 | A1 | 2/2002 | Zheng | 277/358 |
| 2008/0239575 | A1 | 10/2008 | White | 360/235.4 |

FOREIGN PATENT DOCUMENTS

| | | | |
|---|---|---|---|
| CN | 1401924 | 3/2003 | F16J 15/16 |
| GB | 1380981 A * | 1/1975 | |
| JP | 5842869 | 3/1983 | F16J 15/44 |
| JP | 2236067 | 9/1990 | F16J 15/34 |
| JP | 4000073 | 1/1992 | F16J 15/34 |
| JP | 5322050 | 12/1993 | F16J 15/34 |
| JP | 7071618 | 3/1995 | F16J 15/34 |
| JP | 9273636 | 10/1997 | F16J 15/34 |
| JP | 9329247 | 12/1997 | F16J 15/34 |
| JP | 2002070790 | 3/2002 | F16C 17/02 |
| JP | 2004502913 | 1/2004 | F16J 15/34 |
| JP | 2005180652 | 7/2005 | F16J 15/34 |
| JP | 2006052847 | 2/2006 | F16C 17/04 |
| JP | 2007263374 | 10/2007 | F16J 15/34 |

OTHER PUBLICATIONS

International Search Report issued in PCT/JP2011/072921, dated Dec. 13, 2011, with English translation. (4 pgs).

Ikeuchi et al., "A Face Seal with Circumferential Pumping Grooves and Rayleigh-Steps" Japan Society of Mechanical Engineers Collection (Edition C) Vo. 53 No. 493, Sep. 1987 p. 2017-2024. (with English abstract).

A. Lipschitz, "A Zero-Leakage Film Riding Face Seal" Transactions of ASME Journal of Tribology vol. 107, Jul. 1985 p. 326-332.

International Preliminary Report on Patentability issued in corresponding application No. PCT/JP2011/072921, dated Apr. 9, 2013 (5 pgs).

Office Action issued in corresponding U.S. Appl. No. 13/702,056, dated Dec. 20, 2013 (20 pgs).

Office Action issued in U.S. Appl. No. 14/292,610, dated Aug. 14, 2015 (24 pgs).

* cited by examiner

HIGH-PRESSURE FLUID SIDE
LOW-PRESSURE FLUID SIDE
COUNTERPART SLIDING SURFACE ROTATIONAL DIRECTION
1
2
3
4
5
6
7
8
4(n−1)
3(n)
(a)
3 RAYLEIGH STEP MECHANISM
4 REVERSE RAYLEIGH STEP MECHANISM
9
11
(b)

(a) RAYLEIGH STEP MECHANISM (b) REVERSE RAYLEIGH STEP MECHANISM (c) MODIFIED RAYLEIGH STEP MECHANISM (d) MODIFIED REVERSE RAYLEIGH STEP MECHANISM (e) MODIFIED RAYLEIGH STEP MECHANISM (f) MODIFIED REVERSE RAYLEIGH STEP MECHANISM

Fig. 4
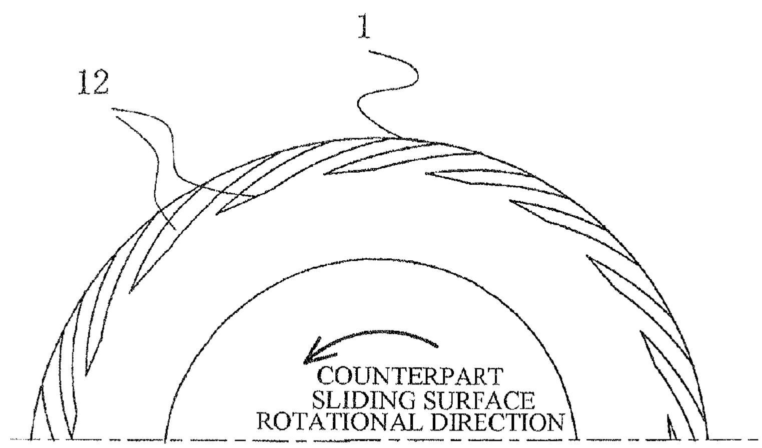
(a)
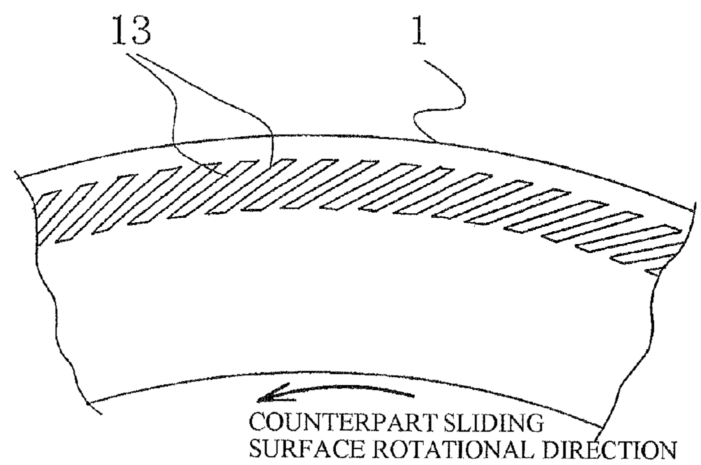
(b)
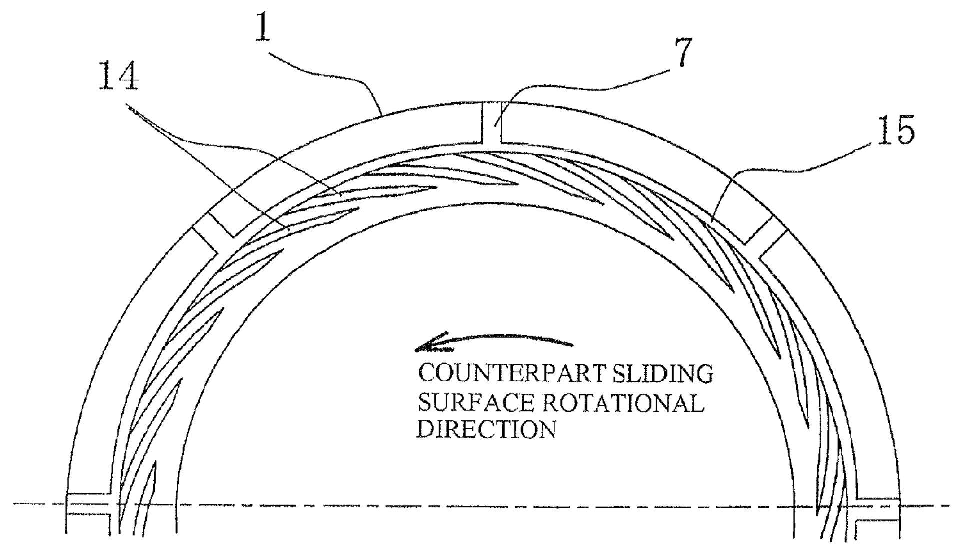
(c)

7
2
9
3
5
7
(a)
OCCURRENCE OF LEAKAGE
PRESSURE DISTRIBUTION
p
θ
r
PRESSURE GRADIENT ∂p/∂r IN RADIAL DIRECTION IS POSITIVE IN INTERNAL-PERIPHERAL-SIDE END
(b)

Fig. 9
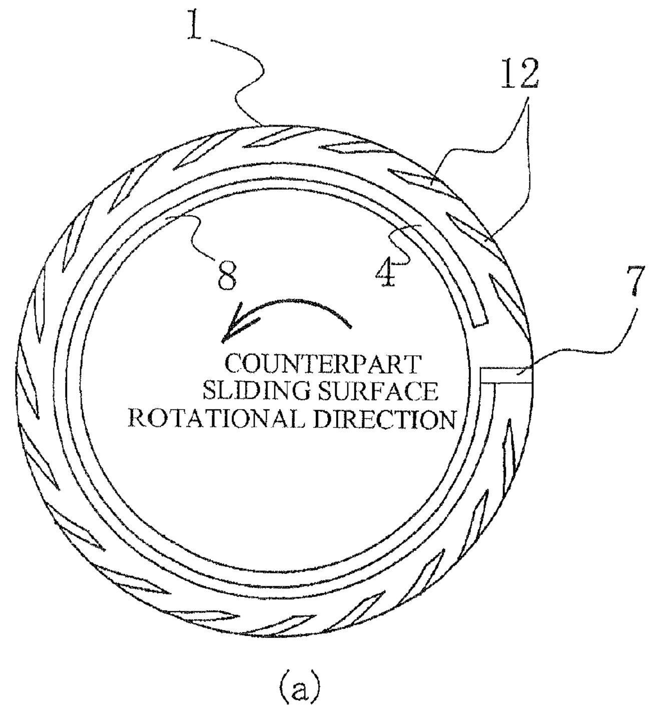
(a)
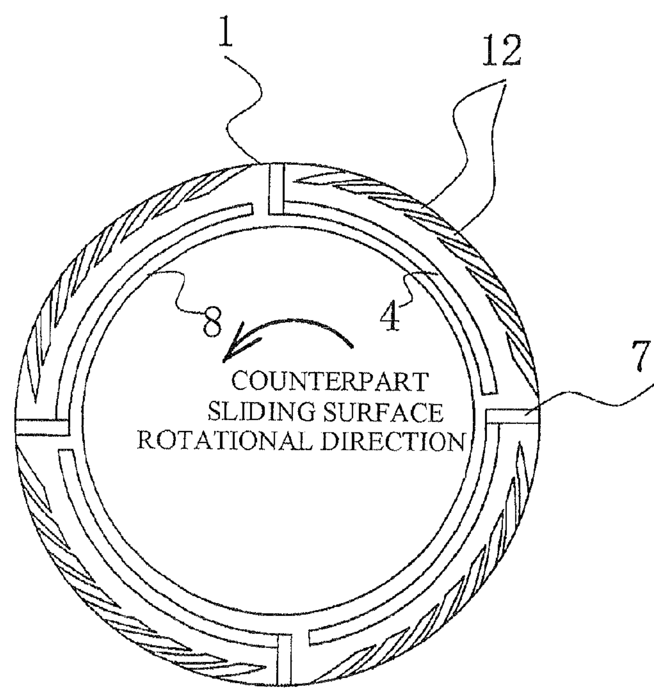
(b)

HIGH-PRESSURE FLUID SIDE
LOW-PRESSURE FLUID SIDE
COUNTERPART SLIDING SURFACE ROTATIONAL DIRECTION
LOW-PRESSURE FLUID SIDE
1-1
7
2-1
3
5
8
1-2
2-2
7
8
4
6

Fig. 12

TEST CONDITIONS

| | |
|---|---|
| ROTATIONAL SPEED | 500rpm |
| SEALED FLUID | WATER-BASED LUBRICATING OIL |
| SEALED PRESSURE | 0.1, 0.3MPa (GAUGE PRESSURE) |
| TEST TEMPERATURE | 90℃ |
| MOUNTED SURFACE PRESSURE | 0.25MPa |

LEAKAGE RATE UNDER DIFFERENT CONDITIONS, ml/h

| SHAPE | PRESSURE | |
|---|---|---|
| | 0. 1MPa | 0. 3MPa |
| COMPARATIVE EXAMPLE FIGS. 6, 7 | 0. 36 | 0. 57 |
| PRESENT INVENTION FIG. 8(a)<br>EIGHT RAYLEIGH STEP MECHANISMS<br>EIGHT REVERSE RAYLEIGH STEP MECHANISMS | 0. 07 | 0. 47 |
| PRESENT INVENTION FIG. 8(b)<br>THREE RAYLEIGH STEP MECHANISMS<br>THREE REVERSE RAYLEIGH STEP MECHANISMS | 0. 00 | 0. 15 |
| PRESENT INVENTION FIG. 8(c)<br>THREE RAYLEIGH STEP MECHANISMS<br>THREE REVERSE RAYLEIGH STEP MECHANISMS<br>(INTERNAL PERIPHERAL SURFACE WIDTH DOUBLED) | 0. 00 | 0. 05 |
| PRESENT INVENTION FIG. 8(d)<br>THREE RAYLEIGH STEP MECHANISMS<br>ONE REVERSE RAYLEIGH STEP MECHANISMS<br>(INTERNAL PERIPHERAL SURFACE WIDTH DOUBLED) | 0. 00 | 0. 01 |

Fig. 15
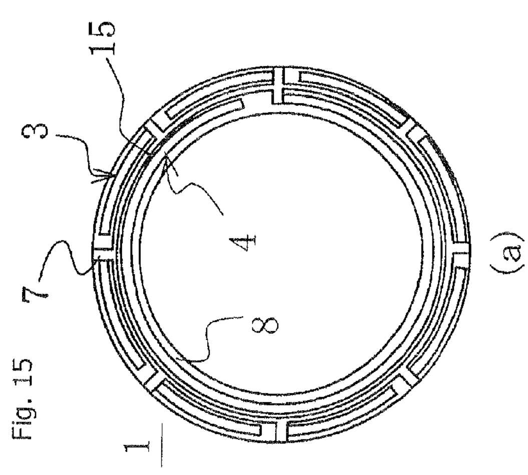
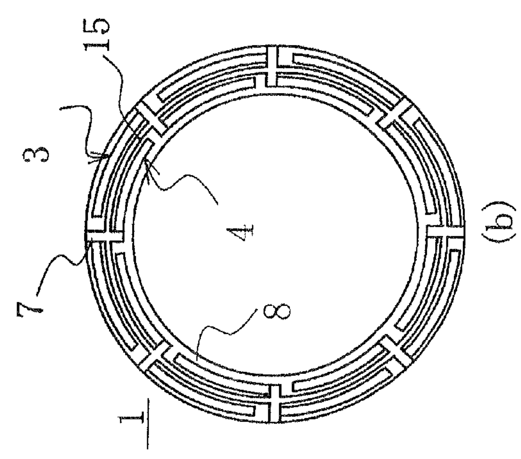
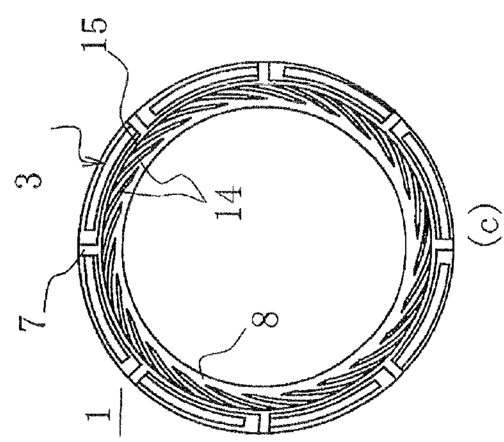
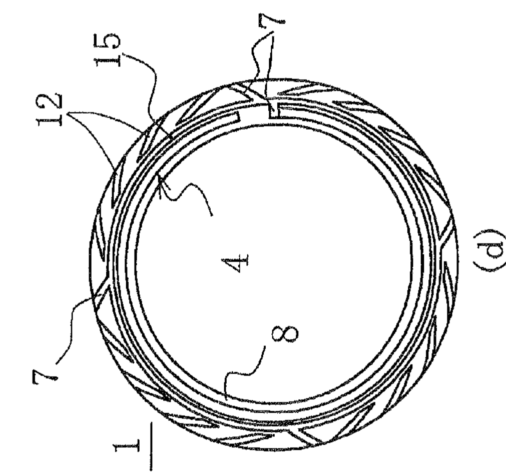
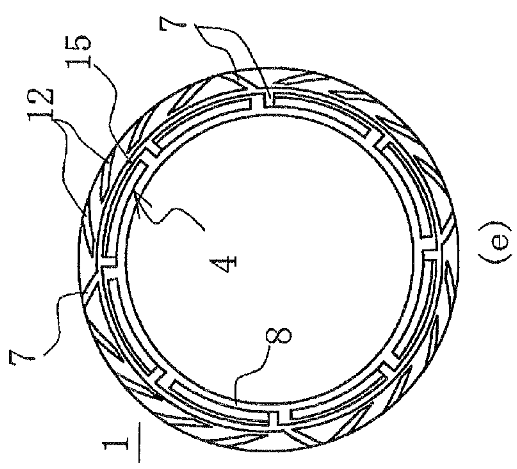
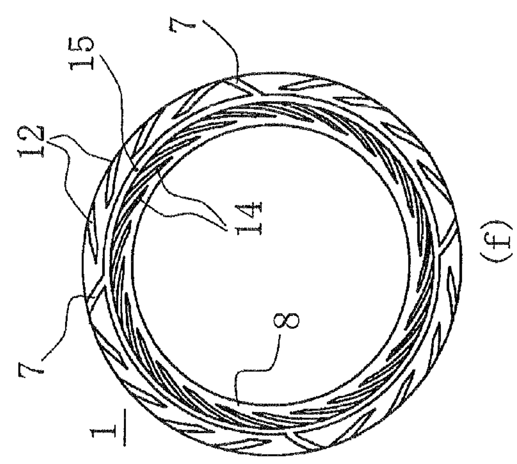

HIGH-PRESSURE FLUID SIDE
LOW-PRESSURE FLUID SIDE
COUNTERPART SLIDING SURFACE ROTATIONAL DIRECTION
3 RAYLEIGH STEP MECHANISM
4 REVERSE RAYLEIGH STEP MECHANISM
(a)
(b)

SLIDING COMPONENT

CROSS REFERENCE TO RELATED APPLICATIONS

This application is a divisional of U.S. application Ser. No. 13/702,056, filed Dec. 4, 2012, now U.S. Pat. 8,814,433, which application in turn is a 371 of PCT/JP11/72921, filed Oct. 5, 2011, which in turn claims priority from Japanese Application 2010-226949, filed Oct. 6, 2010, the contents of which are incorporated herein by reference, in their entireties.

BACKGROUND OF THE INVENTION (1) Field of the Invention

The present invention relates to a sliding component applied to a mechanical seal, a bearing, or another sliding part, for example. The present invention particularly relates to a sliding component of a sealing ring, a bearing, or the like, in which a fluid is present on sliding surfaces to reduce friction, and the fluid must be prevented from leaking out from the sliding surfaces.

(2) Background Art

In a mechanical seal, which is one example of a sliding component, the contrary conditions “sealing” and “lubrication” must both be achieved in order to maintain airtightness over a long period of time. Particularly, in recent years there has been a rising demand for less friction in order to prevent leakage of sealed fluid and reduce mechanical loss, for the sake of environmental measures and the like. The means of reducing friction can be achieved by creating a so-called fluid lubrication state, in which dynamic pressure is generated by rotation between sliding surfaces and sliding occurs in the presence of a liquid membrane. However, in this case, positive pressure is generated between the sliding surfaces, and the fluid flows out of the sliding surfaces from the positive pressure portion. This is known as lateral leakage in a bearing, and is equivalent to the leakage in the case of a seal. The sealed fluid is located on the external peripheral side of the seal surface, the atmosphere is located on the internal peripheral side, and the internal-peripheral-side leakage rate when the fluid on the external peripheral side is scaled (known as the “inside type”) is expressed by the following formula.

$$Q = -\int\left(\frac{h^3}{12\eta}\frac{\partial p}{\partial r}\bigg|_{r=\eta}\right)r_1 \cdot d\theta \qquad \text{[Formula 1]}$$

Q: internal-peripheral-side leakage rate in sliding surface inside diameter r1 h: gap height

η: fluid viscosity p: pressure

It is clear from the above formula that as fluid lubrication is promoted, dynamic pressure is generated, and a liquid membrane is formed; the pressure gradient ∂p/∂r on the internal peripheral end side increases, h increases, and as a result, the leakage rate Q increases.

Consequently, to reduce the leakage rate Q in the case of a seal, the gap h and the pressure gradient ∂p/∂r must be reduced.

From the above matters, in a conventional seal, a so-called compromise of sealing and lubrication, in which sealing performance is maintained, is achieved by reducing the liquid membrane thickness h to an extent that does not damage the sliding surfaces.

Consequently, in a seal used in an environment where contact causes immediate surface damage such as scorching, the result of prioritizing the dynamic pressure effect is that the liquid membrane thickness h increases and the leakage rate therefore increases. In a seal used in an environment in which direct contact does not readily cause problems even over a long period of time, the result of prioritizing sealing performance is that the gap h is small, the dynamic pressure effect is also small, and there is therefore a higher possibility of surface abrasion or damage due to direct contact, and a higher frictional coefficient. An example of the former structure is the invention disclosed in Patent Document 1, for example. This invention is a dry gas seal but can also be applied to a liquid seal, and although an excellent dynamic pressure effect is obtained, the leakage rate is extremely high. An example of the latter structure is a structure in which calcined carbon having excellent self-lubrication in a stationary ring side is used so that problems are unlikely to occur even with direct contact, and flat surfaces are sealed together. In another example, undulation or a spiral groove is implemented as a dynamic pressure generating mechanism (see Patent Documents 2 and 3, for example).

In a liquid seal, since viscosity is higher than gas, the dynamic pressure effect is obtained by the unevenness of minute asperities or roughness of the surfaces, even if the surfaces are flat. Therefore, structures that prioritize sealing performance are often used. To achieve both sealing and lubrication, a number of structures have been proposed which have a pumping effect of drawing leaked liquid back to the high-pressure side. Patent Document 4, for example, discloses a mechanism in which pumping is achieved by shear flow, due to a “barrier” of a different height being set up in advance between two rotating or static surfaces separated by a gap. In this mechanism, the structure is complicated because an initial gap must be provided mechanically, and since the gap is also present when no motion is occurring, a problem is encountered in that leakage occurs when no motion is occurring.

Non-patent Document 1 discloses a structure in which a high-pressure-side fluid is temporarily retained in a dam part, and after dynamic pressure is generated in a Rayleigh step bearing part, the fluid is returned to the high-pressure side. In this structure, since dynamic pressure is not generated until the liquid is retained in the dam part, sliding occurs along with direct contact immediately after rotation starts, and accordingly there is a risk of surface damage occurring during this time.

Furthermore, Non-patent Document 2 discloses a proposal of creating a pumping effect using a shear flow during rotation, due to a pumping groove being set up on the upstream side of a Rayleigh step. In this mechanism, a problem is encountered in that leakage occurs when no motion is occurring because a high-pressure side and a low-pressure side are joined by the pumping groove.

The present applicant has submitted for application, as an invention relating to a sliding component, an invention in which a sealed fluid is led into a sliding surface by suction means formed on a sealed fluid side of the sliding surface, and the led-in sealed fluid is stored via a dam part in two dimple parts formed in the sliding surface, one on a radially external peripheral side and one on a radially internal peripheral side, while the sealed fluid is simultaneously pumped in the dimple part on the radially internal peripheral side; whereby the sealed fluid is prevented from leaking out from a seal surface positioned nearer the radially internal peripheral side than the two dimple parts (see Patent Document 5). In this invention, among the two dimple parts, a pumping action is created in the dimple part on the radially internal peripheral side to prevent the sealed fluid from leaking out from the seal surface, but the dimple part on the radially internal peripheral side forms a closed space and therefore has no negative pressure. Therefore, it is not possible to prevent leakage of the fluid present on the sliding surface that is nearer the radially internal peripheral side than the dimple part. Specifically, it is possible to prevent leakage to a certain extent, but an increase in the leakage rate cannot be avoided.

As described above, there is no conventional technique for achieving both sealing and lubrication wherein there is no leakage when no motion is occurring, and during rotation including the start of rotation, fluid lubrication is in effect and leakage is prevented.

PRIOR ART DOCUMENTS

Patent Documents

Patent Document 1: JP-A 4-73
Patent Document 2: U.S. Pat. No. 5,071,141
Patent Document 3: U.S. Pat. No. 7,377,518
Patent Document 4: JP-A 58-42869
Patent Document 5: JP-A 2005-180652

Non-Patent Documents

Non-patent Document 1: Transactions of ASME Journal of Tribology Vol. 107, JULY 1985 p. 326-322 “A Zero-Leakage Film Riding Face Seal” A. Lipschitz Non-patent Document 2: Japan Society of Mechanical Engineers Collection (Edition C) Vo. 53 No. 493, September 1987 p. 2017-2024 “A Face Seal with Circumferential Pumping Grooves and Rayleigh-Steps” Takeshi Ikeuchi, Haruo Mori, Tohru Nishida

SUMMARY OF THE INVENTION

Problems to be Solved by the Invention

An object of the present invention is to provide a sliding component wherein there is no leakage when no motion is occurring, fluid lubrication is in effect and leakage is prevented during rotation including the start of rotation, and both sealing and lubrication can be achieved.

Means for Solving these Problems

A first aspect of the sliding component of the present invention for achieving the object described above is characterized in that a negative pressure generating mechanism comprising a negative pressure generating groove is provided to a low-pressure side of one of two sliding surfaces that slide relative to each other in a pair of sliding components, the negative pressure generating groove being communicated with a high-pressure fluid side via a radial-direction groove and separated from a low-pressure fluid side by a seal surface.

According to the first aspect, there is no leakage when no motion is occurring, the pressure gradient $\partial p/\partial r$ in the end of the low-pressure side of the sliding surface (e.g., the seal internal peripheral side in the case of an inside-type mechanical seal) can be made negative during usual times including the start of relative sliding, and a pumping action occurs from the low-pressure side of the sliding surface toward the high-pressure fluid side; therefore, the leakage rate can be significantly reduced.

A second aspect of the sliding component of the present invention is characterized in that a positive pressure generating mechanism comprising a positive pressure generating groove is provided to a high-pressure side of one of two sliding surfaces that slide relative to each other in a pair of sliding components, and a negative pressure generating mechanism comprising a negative pressure generating groove is provided to a low-pressure side, the positive pressure generating groove and negative pressure generating groove being communicated with a high-pressure fluid side and separated from a low-pressure fluid side by a seal surface.

A third aspect of the sliding component of the present invention is characterized in that appositive pressure generating mechanism comprising a positive pressure generating groove is provided to a high-pressure side of one of two sliding surfaces that slide relative to each other in a pair of sliding components, and a negative pressure generating mechanism comprising a negative pressure generating groove is provided to a low-pressure side of the other sliding surface, the positive pressure generating groove and negative pressure generating groove being communicated with a high-pressure fluid side and separated from a low-pressure fluid side by a seal surface.

A fourth aspect of the sliding component of the present invention is characterized in that an external peripheral side of a pair of sliding components is a high-pressure fluid side and an internal peripheral side is a low-pressure fluid side, a positive pressure generating mechanism comprising a positive pressure generating groove is provided to a high-pressure side of a sliding surface of a stationary-side sliding component, and a negative pressure generating mechanism comprising a negative pressure generating groove is provided to a low-pressure side of a sliding surface of a rotating-side sliding component, the positive pressure generating groove and negative pressure generating groove being communicated with the high-pressure fluid side and separated from the low-pressure fluid side by an internal-peripheral-side seal surface.

A fifth aspect of the sliding component of the present invention is characterized in that a pair of sliding components comprise annular bodies, an external peripheral side of the annular bodies is a high-pressure fluid side and an internal peripheral side is a low-pressure fluid side; in a sliding surface on one side of the annular body, a positive pressure generating mechanism comprising a positive pressure generating groove is provided to the external peripheral side, and a negative pressure generating mechanism comprising a negative pressure generating groove is provided to the internal peripheral side; the positive pressure generating groove and negative pressure generating groove being communicated with the high-pressure fluid side and separated from the low-pressure fluid side by an internal-peripheral-side seal surface.

A sixth aspect of the sliding component of the present invention is characterized in that a pair of sliding components comprise annular bodies, an external peripheral side of the annular bodies is a high-pressure fluid side and an internal peripheral side is a low-pressure fluid side; a positive pressure generating mechanism comprising a positive pressure generating groove is provided to the external peripheral side on a stationary-side sliding surface of the annular body, and a negative pressure generating mechanism comprising a negative pressure generating groove is provided to the internal peripheral side in a rotating-side sliding surface of the annular body; the positive pressure generating groove and negative pressure generating groove being communicated with the high-pressure fluid side and separated from the low-pressure fluid side by an internal-peripheral-side seal surface.

According to the second through sixth aspects, since the sliding surfaces operate in a state of fluid lubrication during usual times including the start of relative sliding, the frictional coefficient can be lowered, there is no leakage when no motion is occurring, the pressure gradient $\partial p/\partial r$ in the low-pressure side of the sliding surface can be made negative during usual times including the start of relative sliding, a pumping action occurs from the low-pressure side of the sliding surface toward the high-pressure fluid side, and the leakage rate can therefore be significantly reduced.

Furthermore, according to the third and sixth aspects, since there is more space than in cases in which both a Rayleigh step mechanism and a reverse Rayleigh step mechanism are provided to the same sliding surface, the mechanisms are easily disposed in the sliding surfaces, and machining time can be shortened.

Furthermore, according to the fourth aspect, the fluid used for lubrication is not susceptible to the effects of centrifugal force from rotation, an appropriate amount of fluid can be ensured between the sliding surfaces, and a better state of fluid lubrication can therefore be obtained.

A seventh aspect of the sliding component of the present invention is any of the second through sixth aspects, characterized in that the external-peripheral-side positive pressure generating mechanism is formed from a Rayleigh step mechanism, and the internal-peripheral-side negative pressure generating mechanism is formed from a reverse Rayleigh step mechanism, the Rayleigh step mechanism and reverse Rayleigh step mechanism being communicated with the high-pressure fluid side via a radial-direction groove.

According to the seventh aspect, the positive pressure generating mechanism and the negative pressure generating mechanism can be easily provided to the sliding surfaces of the sliding components.

An eighth aspect of the sliding component of the present invention is the seventh aspect, characterized in that pluralities of Rayleigh step mechanisms and reverse Rayleigh step mechanisms are provided in parallel in a circumferential direction so as to constitute pairs, and an upstream end of a groove part of an $n^{th}$ Rayleigh step mechanism and a downstream end of a groove part of an $n-1^{th}$ reverse Rayleigh step mechanism are formed so as to substantially coincide in a position in the circumferential direction as seen from the upstream side, both groove parts being communicated with the high-pressure fluid side via shared communication means.

According to the eighth aspect, Rayleigh step mechanisms and reverse Rayleigh step mechanisms can be efficiently placed in the sliding surfaces of the sliding components comprising annular bodies, the number of radial-direction grooves can be reduced, and the fluid leakage rate can therefore be reduced.

A ninth aspect of the sliding component of the present invention is the seventh aspect, characterized in that a plurality of Rayleigh step mechanisms and one reverse Rayleigh step mechanism are provided in parallel in a circumferential direction, an upstream end of a groove part of the Rayleigh step mechanisms and a downstream end of a groove part of the reverse Rayleigh step mechanism are formed so as to substantially coincide in a position in the circumferential direction, and the groove parts are communicated with the high-pressure fluid side via a shared radial-direction groove, the upstream ends of the groove parts of the remaining Rayleigh step mechanisms being individually communicated with the high-pressure fluid side via individual radial-direction grooves.

According to the ninth aspect, the Rayleigh step mechanisms and the reverse Rayleigh step mechanism can be efficiently placed in the sliding surfaces of the sliding components comprising annular bodies, the number of shared radial-direction grooves can be kept at one, and the fluid leakage rate can therefore be minimized A tenth aspect of the sliding component of the present invention is the seventh aspect, characterized in that a plurality of reverse Rayleigh step mechanisms are provided in a radial direction.

According to the tenth aspect, negative pressure is generated incrementally, a structure capable of better preventing leakage is achieved, and the invention is therefore applicable to a high-pressure and high-speed seal.

An eleventh aspect of the sliding component of the present invention is characterized in that a positive pressure generating mechanism comprising a spiral groove or a dimple directly communicated with a high-pressure fluid side is provided to a high-pressure side of one of two sliding surfaces that slide relative to each other in a pair of sliding components, and a negative pressure generating mechanism comprising a reverse Rayleigh step mechanism is provided to a low-pressure side, the reverse Rayleigh step mechanism being communicated with the high-pressure fluid side via a radial-direction groove and separated from a low-pressure fluid side by a seal surface.

According to the eleventh aspect, the positive pressure generating mechanism can be formed from a spiral groove or a dimple.

A twelfth aspect of the present invention is characterized in that a positive pressure generating mechanism comprising a positive pressure generating groove is provided to a high-pressure side of one of two sliding surfaces that slide relative to each other in a pair of sliding components, a negative pressure generating mechanism comprising a negative pressure generating groove is provided to a low-pressure side, and a pressure release groove is provided between the positive pressure generating groove and negative pressure generating groove, the positive pressure generating groove, pressure release groove, and negative pressure generating groove being communicated with a high-pressure fluid side and separated from a low-pressure fluid side by a seal surface.

A thirteenth aspect of the sliding component of the present invention is characterized in that a positive pressure generating mechanism comprising a positive pressure generating groove is provided to a high-pressure side of one of two sliding surfaces that slide relative to each other in a pair of sliding components, a negative pressure generating mechanism comprising a negative pressure generating groove is provided to a low-pressure side of the other sliding surface, and a pressure release groove is provided to each of the one and other sliding surfaces so as to be positioned between the positive pressure generating groove and negative pressure generating groove, the positive pressure generating groove, pressure release grooves, and negative pressure generating groove being communicated with a high-pressure fluid side and separated from a low-pressure fluid side by a seal surface.

A fourteenth aspect of the sliding component of the present invention is characterized in that an external peripheral side of a pair of sliding components is a high-pressure fluid side, an internal peripheral side is a low-pressure fluid side, a positive pressure generating mechanism comprising a positive pressure generating groove is provided to a high-pressure side of a sliding surface of a stationary-side sliding component, a negative pressure generating mechanism comprising a negative pressure generating groove is provided to a low-pressure side of a sliding surface of a rotating-side sliding component, and a pressure release groove is provided to each of the stationary and rotating-side sliding surfaces so as to be positioned between the positive pressure generating groove and negative pressure generating groove, the positive pressure generating groove, pressure release grooves, and negative pressure generating groove being communicated with the high-pressure fluid side and separated from the low-pressure fluid side by a seal surface.

A fifteenth aspect of the sliding component of the present invention is characterized in that a pair of sliding components comprise annular bodies, an external peripheral side of the annular bodies is a high-pressure fluid side and an internal peripheral side is a low-pressure fluid side; a positive pressure generating mechanism comprising a positive pressure generating groove is provided to a high-pressure side of a sliding surface of the annular body, a negative pressure generating mechanism comprising a negative pressure generating groove is provided to a low-pressure side, and a pressure release groove is provided between the positive pressure generating groove and negative pressure generating groove, the positive pressure generating groove, pressure release groove, and negative pressure generating groove being communicated with the high-pressure fluid side and separated from the low-pressure fluid side by a seal surface.

A sixteenth aspect of the sliding component of the present invention is characterized in that a pair of sliding components comprise annular bodies, an external peripheral side of the annular bodies is a high-pressure fluid side and an internal peripheral side is a low-pressure fluid side, a positive pressure generating mechanism comprising a positive pressure generating groove is provided to a high-pressure side in a stationary-side sliding surface of the annular body, a negative pressure generating mechanism comprising a negative pressure generating groove is provided to a low-pressure side of a rotating-side sliding surface of the annular body, and a pressure release groove is provided to the stationary and rotating-side sliding surfaces so as to be positioned between the positive pressure generating groove and negative pressure generating groove, the positive pressure generating groove, pressure release grooves, and negative pressure generating groove being communicated with the high-pressure fluid side and separated from the low-pressure fluid side by a seal surface.

According to the twelfth through sixteenth aspects, since the sliding surfaces operate in a state of fluid lubrication during usual times including the start of relative sliding, the frictional coefficient can be lowered, there is no leakage when no motion is occurring, the pressure gradient $\partial p/\partial r$ in the low-pressure side of the sliding surface can be made negative during usual times including the start of relative sliding, a pumping action occurs from the low-pressure side of the sliding surface toward the high-pressure fluid side, and the leakage rate can therefore be significantly reduced. Additionally, dynamic pressure generated by the high-pressure-side positive pressure generating mechanism can be released to the pressure of the high-pressure fluid, the fluid can be prevented from flowing into the low-pressure-side negative pressure generating mechanism, and the negative pressure generating performance of the negative pressure generating mechanism can be prevented from decreasing.

Furthermore, according to the thirteenth and sixteenth aspects, since there is more space than in cases in which both a Rayleigh step mechanism and a reverse Rayleigh step mechanism are provided to the same sliding surface, the mechanisms are easily disposed in the sliding surfaces, and machining time can be shortened.

Furthermore, according to the fourteenth aspect described above, the fluid used for lubrication is not susceptible to the effects of centrifugal force from rotation, an appropriate amount of fluid can be ensured between the sliding surfaces, and a better state of fluid lubrication can therefore be obtained.

A seventeenth aspect of the sliding component of the present invention is any of the twelfth through sixteenth aspects, characterized in that characterized in that the external-peripheral-side positive pressure generating mechanism is formed from a Rayleigh step mechanism, the internal-peripheral-side negative pressure generating mechanism is formed from a reverse Rayleigh step mechanism, and the pressure release groove is formed from a circular groove, the Rayleigh step mechanism, reverse Rayleigh step mechanism, and pressure release groove all being communicated with the high-pressure fluid side via a radial-direction groove.

According to the seventeenth aspect, in addition to the effects of the twelfth through sixteenth aspects, the positive pressure generating mechanism and the negative pressure generating mechanism can easily be provided to the sliding surfaces of the sliding components.

An eighteenth aspect of the sliding component of the present invention is the seventeenth aspect, characterized in that pluralities of Rayleigh step mechanisms and reverse Rayleigh step mechanisms are provided in parallel in a circumferential direction to either side of the pressure release groove so as to constitute pairs, and an upstream end of a groove part of an $n^{th}$ Rayleigh step mechanism and a downstream end of a groove part of an $n-1^{th}$ reverse Rayleigh step mechanism are formed so as to substantially coincide in a position in the circumferential direction as seen from the upstream side, both groove parts and the pressure release groove being communicated with the high-pressure fluid side via a shared radial-direction groove.

According to the eighteenth aspect, in addition to the effects of the eleventh aspect, Rayleigh step mechanisms and reverse Rayleigh step mechanisms can be efficiently placed in the sliding surfaces of the sliding components comprising annular bodies, the number of radial-direction grooves can be reduced, and the fluid leakage rate can therefore be reduced.

A nineteenth aspect of the sliding component of the present invention is the seventeenth aspect, characterized in that a plurality of Rayleigh step mechanisms and one reverse Rayleigh step mechanism are provided in parallel in a circumferential direction on either side of the pressure release groove, an upstream end of a groove part of one Rayleigh step mechanism and a downstream end of a groove part of the reverse Rayleigh step mechanism are formed so as to substantially coincide in a position in the circumferential direction, and the groove parts and the pressure release groove are communicated with the high-pressure fluid side via a shared radial-direction groove, the upstream ends of the groove parts of the remaining Rayleigh step mechanisms being communicated with the high-pressure fluid side via a radial-direction groove of the pressure release groove.

According to the nineteenth aspect, in addition to the effects of the seventeenth aspect, the Rayleigh step mechanisms and the reverse Rayleigh step mechanism can be efficiently placed in the sliding surfaces of the sliding components comprising annular bodies, the number of shared radial-direction grooves can be kept at one, and the fluid leakage rate can therefore be minimized.

A twentieth aspect of the sliding component of the present invention is the seventeenth aspect, characterized in that a plurality of reverse Rayleigh step mechanisms are provided in a radial direction.

According to the twentieth aspect, negative pressure is generated incrementally, a structure capable of better preventing leakage is achieved, and the invention is therefore applicable to a high-pressure and high-speed seal.

A twenty-first aspect of the sliding component of the present invention is characterized in that a positive pressure generating mechanism comprising a spiral groove or a dimple directly communicated with a high-pressure fluid side is provided to a high-pressure side of one of two sliding surfaces that slide relative to each other in a pair of sliding components, a negative pressure generating mechanism composed of a reverse spiral groove is provided to a low-pressure side, and a pressure release groove is provided between the spiral groove or dimple and reverse Rayleigh step mechanism, the pressure release groove and reverse Rayleigh step mechanism being communicated with the high-pressure fluid side via a radial-direction groove and separated from a low-pressure fluid side by a seal surface.

A twenty-second aspect of the sliding component of the present invention is characterized in that a positive pressure generating mechanism comprising a spiral groove or a dimple directly communicated with a high-pressure fluid side is provided to a high-pressure side of one of two sliding surfaces that slide relative to each other in a pair of sliding components, a negative pressure generating mechanism composed of a reverse spiral groove is provided to a low-pressure side, and a pressure release groove is provided between the high-pressure-side spiral groove or dimple and the low-pressure-side reverse spiral groove, the low-pressure-side reverse spiral groove being communicated with the high-pressure fluid side via the pressure release groove and a radial-direction groove and separated from the low-pressure fluid side by a seal surface.

According to the twenty-first and twenty-second aspects, in addition to the effects of the twelfth through sixteenth aspects, the positive pressure generating mechanism can be formed from a spiral groove or a dimple, and the negative pressure generating mechanism can be formed from a reverse Rayleigh step mechanism or a reverse spiral groove.

A twenty-third aspect of the sliding component of the present invention is any of the third through twenty-second aspects, characterized in that the width of the internal-peripheral-side seal surface can be varied.

According to the twenty-third aspect, in cases in which the pressure of the sealed fluid is high and other such cases having a high possibility of leakage, the leakage rate can be reduced by increasing the width of the internal-peripheral-side seal surface.

A twenty-fourth aspect of the sliding component of the present invention is any of the first through twenty-third aspects, characterized in that the radial-direction groove is shaped so as to be slanted from the internal peripheral side communicated with the negative pressure generating mechanism to the external peripheral side in the rotational direction of the counterpart sliding surface.

According to the twenty-fourth aspect, the same negative pressure effect as with the reverse spiral groove occurs in the radial-direction groove, fluid leaking from the high-pressure side is drawn in, creating an action of pushing back to the high-pressure fluid side in a state of a lessened positive pressure gradient in the radial direction, and leakage from the radial-direction groove can therefore be reduced.

Effect of the Invention

The present invention achieves excellent effects such as those below.

(1) According to the first through sixth aspects, there is no leakage when no motion is occurring, the pressure gradient $\partial p/\partial r$ in the low-pressure side (the internal peripheral side) of the sliding surface can be made negative during usual times including the start of relative sliding, and as a result, Q in formula 1 can be made negative. Specifically, a pumping action occurs from the low-pressure side of the sliding surface toward the high-pressure fluid side, and the leakage rate can therefore be significantly reduced. Furthermore, according to the third and fifth aspects, since there is more space than in cases in which both a Rayleigh step mechanism and a reverse Rayleigh step mechanism are provided to the same sliding surface, the mechanisms are easily disposed in the sliding surfaces, and machining time can be shortened.

According to the fourth aspect, the fluid used for lubrication is not susceptible to the effects of centrifugal force from rotation, an appropriate amount of fluid can be ensured between the sliding surfaces, and a better state of fluid lubrication can therefore be obtained.

(2) According to the seventh aspect described above, in addition to the effects of (1) described above, the positive pressure generating mechanism and the negative pressure generating mechanism can be easily provided to the sliding surfaces of the sliding components.

(3) According to the eighth aspect described above, in addition to the effects of (2) described above, the Rayleigh step mechanisms and the reverse Rayleigh step mechanisms can be efficiently placed, the number of radial-direction grooves can be reduced, and the fluid leakage rate can therefore be reduced.

(4) According to the ninth aspect described above, in addition to the effects of (2) described above, the Rayleigh step mechanisms and the reverse Rayleigh step mechanism can be efficiently placed, the number of shared radial-direction grooves can be kept at one, and the fluid leakage rate can therefore be minimized.

(5) According to the tenth aspect described above, in addition to the effects of (2) described above, negative pressure is generated incrementally, a structure capable of better preventing leakage is achieved, and the invention is therefore applicable to a high-pressure and high-speed seal.

(6) According to the eleventh aspect described above, in addition to the effects of (2) described above, the positive pressure generating mechanism can be formed from a spiral groove or a dimple.

(7) According to the twelfth through sixteenth aspects described above, in addition to the effects of (2) described above, dynamic pressure generated by the high-pressure-side positive pressure generating mechanism can be released to the pressure of the high-pressure fluid, the fluid can be prevented from flowing into the low-pressure-side negative pressure generating mechanism, and the negative pressure generating performance of the negative pressure generating mechanism can be prevented from decreasing.

Furthermore, according to the thirteenth and sixteenth aspects, since there is more space than in cases in which both a Rayleigh step mechanism and a reverse Rayleigh step mechanism are provided to the same sliding surface, the mechanisms are easily disposed in the sliding surfaces, and machining time can be shortened.

Furthermore, according to the fourteenth aspect described above, the fluid used for lubrication is not susceptible to the effects of centrifugal force from rotation, an appropriate amount of fluid can be ensured between the sliding surfaces, and a better state of fluid lubrication can therefore be obtained.

(8) According to the seventeenth aspect described above, in addition to the effects of (6) described above, the positive pressure generating mechanism and the negative pressure generating mechanism can easily be provided to the sliding surfaces of the sliding components.

(9) According to the eighteenth aspect described above, in addition to the effects of (7) described above, Rayleigh step mechanisms and reverse Rayleigh step mechanisms can be efficiently placed in the sliding surfaces of the sliding components comprising annular bodies, the number of radial-direction grooves can be reduced, and the fluid leakage rate can therefore be reduced.

(10) According to the nineteenth aspect described above, in addition to the effects of (6) described above, the Rayleigh step mechanisms and the reverse Rayleigh step mechanism can be efficiently placed, the number of shared radial-direction grooves can be kept at one, and the fluid leakage rate can therefore be minimized.

(11) According to the twentieth aspect described above, in addition to the effects of (6) described above, negative pressure is generated incrementally, a structure capable of better preventing leakage is achieved, and the invention is therefore applicable to a high-pressure and high-speed seal.

(12) According to the twenty-first and twenty-second aspects described above, in addition to the effects of (6) described above, the positive pressure generating mechanism can be formed from a spiral groove or a dimple, and the negative pressure generating mechanism can be formed from a reverse Rayleigh step mechanism or a reverse spiral groove.

(13) According to the twenty-third aspect described above, in cases in which the pressure of the sealed fluid is high and other such cases having a high possibility of leakage, the leakage rate can be reduced by increasing the width of the internal-peripheral-side seal surface.

(14) According to the twenty-fourth aspect described above, the same negative pressure effect as the reverse spiral groove occurs in the radial-direction groove, fluid leaking from the high-pressure side is drawn in, creating an action of pushing back to the high-pressure fluid side in a state of a lessened positive pressure gradient in the radial direction, and leakage from the radial-direction groove is therefore reduced.

BRIEF DESCRIPTION OF THE DRAWINGS

FIG. 4 illustrates a positive pressure generating mechanism comprising a spiral groove, a positive pressure generating mechanism composed of a dimple, and a negative pressure generating mechanism composed of a reverse spiral groove, wherein (a) shows the case of a spiral groove, (b) shows the case of a dimple, and (c) shows the case of a reverse spiral groove;

FIG. 9 illustrates examples of combinations of the spiral groove as a positive pressure generating mechanism and the reverse Rayleigh step mechanism as a negative pressure generating mechanism according to Embodiment 1 of the present invention;

FIG. 12 is a chart showing the relationship between pressure and leakage rate in the examples (a) through (d) in Embodiment 1 of the present invention shown in FIG. 8 and in the comparative example shown in FIG. 6;

FIG. 15 illustrates various examples of combinations of Rayleigh step mechanisms and spiral grooves as positive pressure generating mechanisms, and reverse Rayleigh step mechanisms and reverse spiral grooves as negative pressure generating mechanisms, according to Embodiment 2 of the present invention;

DETAILED DESCRIPTION OF THE INVENTION

The best mode for carrying out the sliding component according to the present invention is described in detail with reference to the drawings, but the present invention should not be interpreted as being limited to this mode; various alterations, revisions, and improvements can be made based on knowledge of those skilled in the art as long as there is no deviation from the scope of the present invention.

[Embodiment 1]

Figure 1:
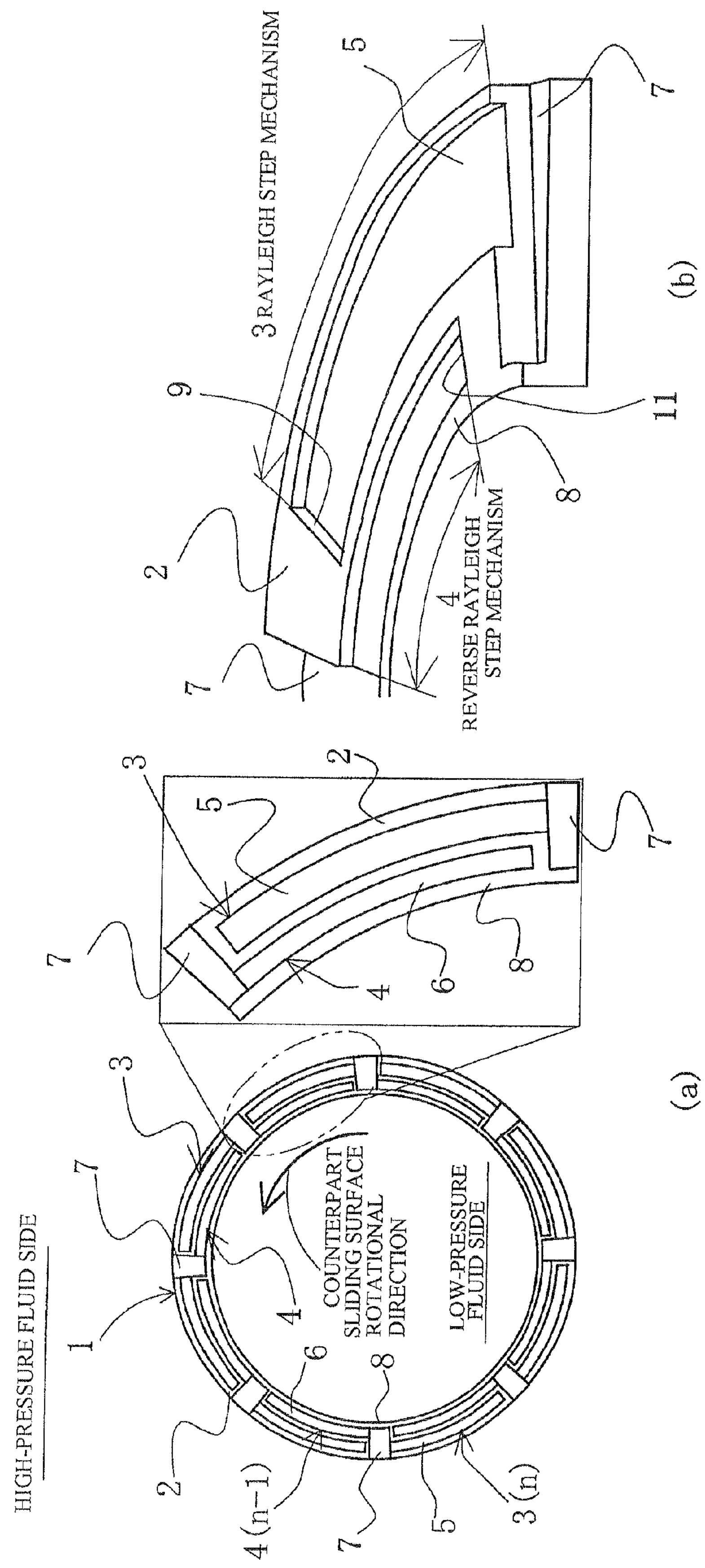
FIG. 1 illustrates a sliding surface of the sliding component according to Embodiment 1 of the present invention, wherein (a) is a plan view of the sliding surface and (b) is a perspective view showing an enlargement of part of the sliding surface.

FIG. 1 illustrates a sliding surface 2 of a sliding component 1 according to Embodiment 1 of the present invention, wherein (a) is a plan view of the sliding surface 2 and (b) is a perspective view showing an enlargement of part of the sliding surface 2.

In FIG. 1, the sliding component 1 is an annular body, wherein usually a high-pressure sealed fluid is present on either the internal or external periphery of the sliding surface 2 of the sliding component 1, and the other periphery is exposed to the atmosphere.

This sealed fluid can be effectively sealed using the sliding component 1. The sliding component 1 is used in both a rotation sealing ring and a fixing sealing ring constituting a pair in a mechanical sealing device, for example. The sliding surface of the rotation sealing ring and the sliding surface of the opposing fixing sealing ring are brought in close contact, and a sealed fluid present on either the internal or external periphery of the sliding surface is sealed. The sliding component can also be used for a bearing that slides against a rotating shaft while lubricating oil is sealed in one side in the axial direction of a cylindrical sliding surface.

In FIG. 1, for the sake of convenience in the description, a case is described in which the high-pressure sealed fluid is present on the external periphery.

In FIG. 1, a counterpart sliding component rotates in a counterclockwise direction relative to the annular body sliding component 1. This holds true even if the sliding component 1 rotates in a clockwise direction.

In the sliding surface 2 of the sliding component 1, the external periphery is provided with a positive pressure generating mechanism 3 composed of a Rayleigh step mechanism, a modified Rayleigh step mechanism, a spiral groove, a dimple, or another positive pressure generating groove; and the internal periphery is provided with a negative pressure generating mechanism 4 composed of a reverse Rayleigh step mechanism, a modified reverse Rayleigh step mechanism, a reverse spiral groove, or another negative pressure generating groove.

The positive pressure generating mechanism 3, which is composed of a Rayleigh step mechanism, a modified Rayleigh step mechanism, a spiral groove, a dimple, or another positive pressure generating groove; and the negative pressure generating mechanism 4, which is composed of a reverse Rayleigh step mechanism, a modified reverse Rayleigh step mechanism, a reverse spiral groove, or another negative pressure generating groove; are described hereinafter.

In FIG. 1, a Rayleigh step mechanism is described as an example of the positive pressure generating mechanism 3, and a reverse Rayleigh step mechanism is described as an example of the negative pressure generating mechanism 4.

A plurality of Rayleigh step mechanisms 3 and reverse Rayleigh step mechanisms 4 are provided in parallel in the circumferential direction so as to constitute pairs and are formed so that as seen from the upstream side, the upstream end of a groove part 5 of an $n^{th}$ Rayleigh step mechanism 3($n$) and the downstream end of a groove part 6 of an $n-1^{th}$ reverse Rayleigh step mechanism 4($n-1$) substantially coincide in a position in the circumferential direction; and these groove parts 5, 6 are communicated with the high-pressure fluid side via a shared radial-direction groove 7 communicated directly with the high-pressure fluid side. The groove part 5 of the Rayleigh step mechanism 3 and the groove part 6 of the reverse Rayleigh step mechanism 4 are isolated from the low-pressure fluid side by a seal surface 8 on the internal peripheral side. Specifically, the radial-direction groove 7 is communicated with the high-pressure fluid side but is not communicated with the low-pressure fluid side.

Figure 2:
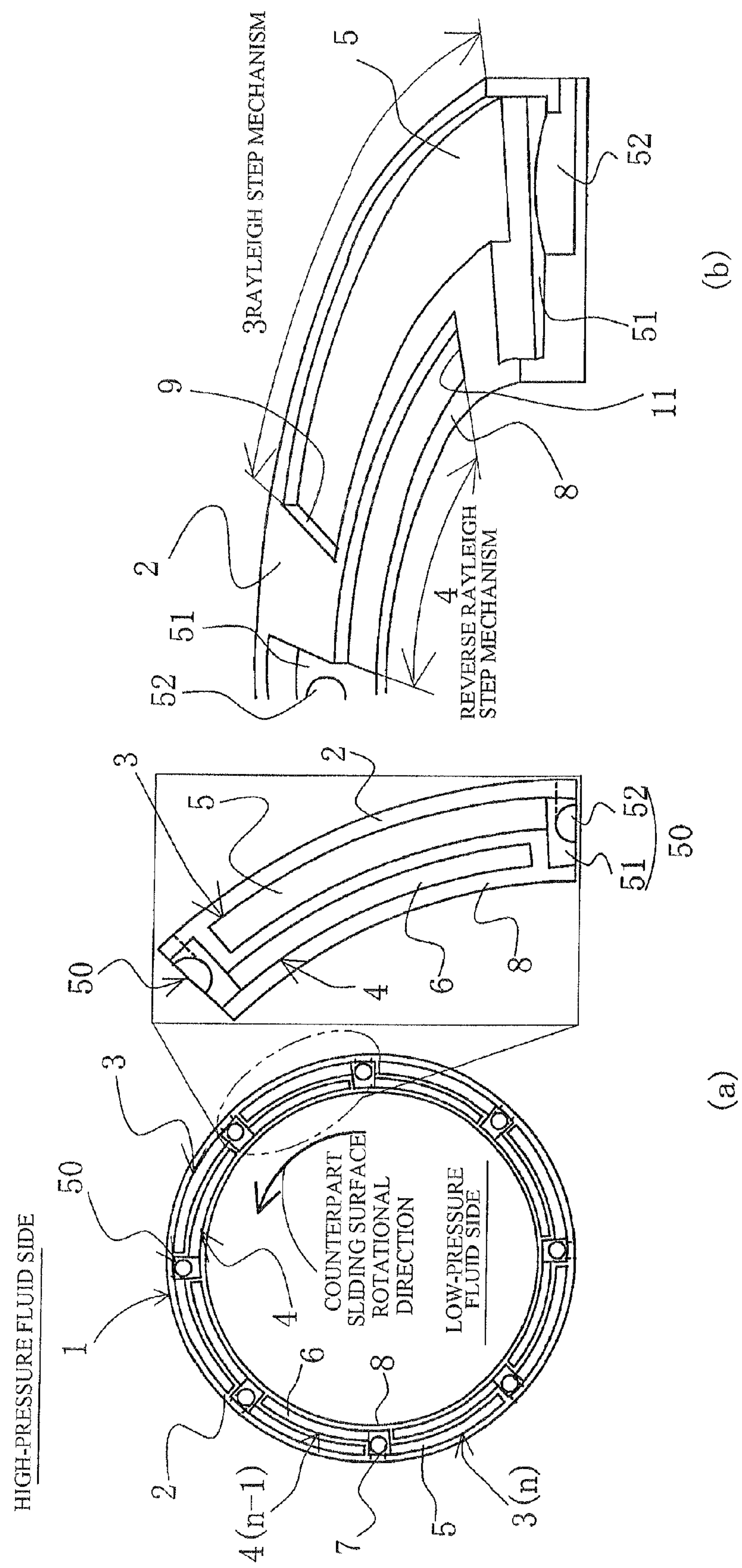
FIG. 2 is a view showing a modification of FIG. 1.

FIG. 2 is a drawing showing a modification of FIG. 1, and in FIG. 2, the same symbols as FIG. 1 indicate the same members as FIG. 1, and detailed descriptions are omitted.

In FIG. 2, the means for communicating the groove parts 5, 6 with the high-pressure fluid side is different from that of FIG. 1, and a communication means 50 is configured from a radial-direction groove 51 and a communication hole 52 not communicated with the high-pressure fluid side due to the sliding surface 2. Specifically, the radial-direction groove 51 of FIG. 2 is not directly communicated with the high-pressure fluid side as is the radial-direction groove 7 of FIG. 1, but the radial-direction groove 51 itself is formed so as to not be communicated with the high-pressure fluid side due to the sliding surface 2, and the groove parts 5, 6 are communicated with the high-pressure fluid side by the communication hole 52 joining the radial-direction groove 51 and the high-pressure fluid side. The communication hole 52, being curved at a substantially right angle from the radial-direction groove 51 as shown in FIG. 2(*b*), is designed so as to be communicated with the high-pressure fluid side positioned on the external peripheral side of the sliding component 1, but is not limited to such; it may be provided facing outward at a slant. In cases in which the high-pressure fluid side is positioned on the internal peripheral side of the sliding component 1, the communication hole could be formed facing inward at a slant.

The "positive pressure generating mechanism" and the "negative pressure generating mechanism" in the present invention are described herein.

Figure 3:
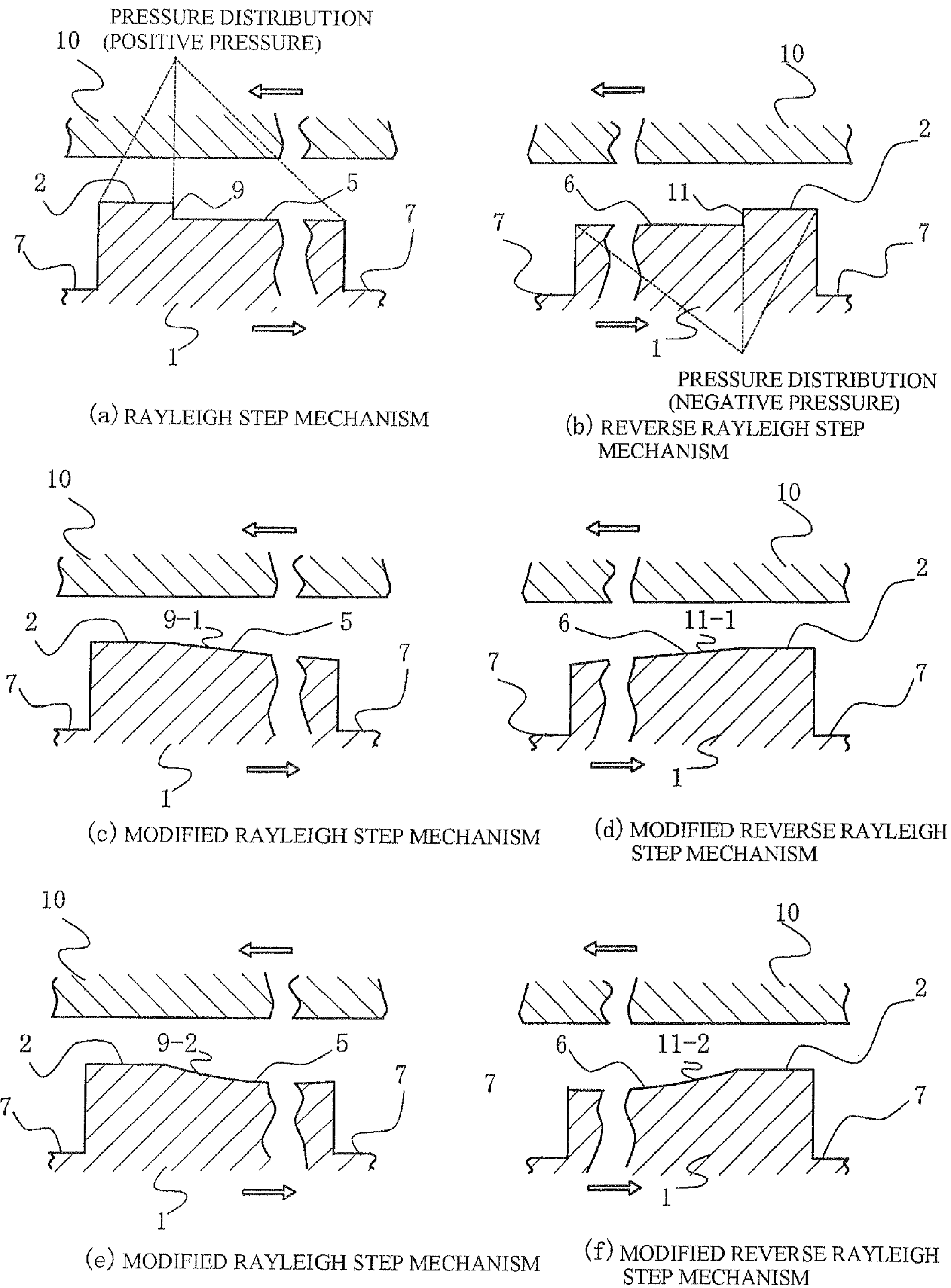
FIG. 3 illustrates a positive pressure generating mechanism composed of a Rayleigh step mechanism or the like and a negative pressure generating mechanism composed of a reverse Rayleigh step mechanism or the like, wherein (a) shows a Rayleigh step mechanism, (b) shows a reverse Rayleigh step mechanism, (c) and (e) show modified Rayleigh step mechanisms, and (d) and (f) show modified reverse Rayleigh step mechanisms.

FIG. 3 is for describing a positive pressure generating mechanism composed of a Rayleigh step mechanism or another positive pressure generating groove and a negative pressure generating mechanism composed of a reverse Rayleigh step mechanism or another negative pressure generating groove, wherein (a) shows a Rayleigh step mechanism, (b) shows a reverse Rayleigh step mechanism, (c) and (e) show modified Rayleigh step mechanisms, and (d) and (f) show modified reverse Rayleigh step mechanisms.

In FIG. 3(*a*), as shown by the arrows, the sliding component 1 rotatably moves in a clockwise direction, and another sliding component 10 rotatably moves in a counterclockwise direction. In the sliding surface 2 of the sliding component 1, a Rayleigh step 9 is formed perpendicular to the relative movement directions and facing upstream, and a groove part 5 is formed on the upstream side of the Rayleigh step 9. The sliding surface of the other sliding component 10 is flat.

When the sliding components 1 and 10 move relative to each other in the directions shown by the arrows, fluid located between the sliding surfaces of the sliding components 1 and 10 acts due to its own viscosity as though to follow in the movement direction of the sliding component 1 or 10, at which time dynamic pressure (positive pressure) such as is shown by the dotted lines is therefore generated by the presence of the Rayleigh step 9.

In FIG. 3(*b*), as shown by the arrows, the sliding component 1 rotatably moves in a clockwise direction and another sliding component 10 rotatably moves in a counterclockwise direction, but in the sliding surface 2 of the sliding component 1, a reverse Rayleigh step 11 is formed perpendicular to the relative movement directions and facing downstream, and a groove part 6 is formed on the downstream side of the reverse Rayleigh step 11. The sliding surface of the other sliding component 10 is flat.

When the sliding components 1 and 10 move relative to each other in the directions shown by the arrows, fluid located between the sliding surfaces of the sliding components 1 and 10 acts due to its own viscosity as though to follow in the movement direction of the sliding component 1 or 10, at which time dynamic pressure (negative pressure) such as is shown by the dotted lines is therefore generated by the presence of the reverse Rayleigh step 11.

In FIG. 3(*c*), the Rayleigh step 9 of FIG. 3(*a*) has been altered in shape to a linear inclined surface 9-1, and in FIG. 3(*e*), the Rayleigh step 9 of FIG. 3(*a*) has been altered in shape to a curved inclined surface 9-2. With the configurations of FIGS. 3(*c*) and (*e*), substantially the same positive pressure as FIG. 3(*a*) is generated. In the present invention, the configurations of FIGS. 3(*c*) and (*e*) are referred to as modified Rayleigh step mechanisms.

In FIG. 3(*d*), the reverse Rayleigh step 11 of FIG. 3(*b*) is altered in shape to a linear inclined surface 11-1, and in FIG. 3(*f*), the reverse Rayleigh step 11 of FIG. 3(*b*) is altered in shape to a curved inclined surface 11-2. With the configurations of FIGS. 3(*d*) and (f), substantially the same negative pressure as FIG. 3(*b*) is generated. In the present invention, the configurations of FIGS. 3(*d*) and (*f*) are referred to as reverse modified Rayleigh step mechanisms.

FIG. 4 is for describing a positive pressure generating mechanism comprising a spiral groove, a positive pressure generating mechanism composed of a dimple, and a negative pressure generating mechanism composed of a reverse spiral groove, wherein (a) shows the case of a spiral groove, (b) shows the case of a dimple, and (c) shows the case of a reverse spiral groove.

The positive pressure generating mechanism of FIG. 4(*a*), a spiral groove 12, is provided over the entire periphery of the sliding surface on the high-pressure side of the sliding component 1 so as to be directly communicated with the high-pressure fluid side. The spiral groove 12 generates positive pressure by relative rotational motion with the counterpart sliding surface.

The positive pressure generating mechanism of FIG. 4(*b*), a dimple 13, is provided over the entire periphery of the sliding surface on the high-pressure side of the sliding component 1 without being directly communicated with the high-pressure fluid side. The dimple 13 generates positive pressure by relative rotational motion with the counterpart sliding surface.

The negative pressure generating mechanism of FIG. 4(*c*), a reverse spiral groove 14, is provided over the entire periphery of the sliding surface of the sliding component 1 without being directly communicated with the low-pressure fluid side. The high-pressure side end of the reverse spiral groove 14 is communicated with a pressure release groove 15, and part of the pressure release groove 15 is connected to the high-pressure fluid side via the radial-direction groove 7. The reverse spiral groove 14 is not directly communicated with the low-pressure fluid side, but is isolated by a seal surface. By the relative rotational motion with the counterpart sliding surface, the reverse spiral groove 14 acts to generate negative pressure and draw in fluid leaking from the high-pressure-side fluid, and to push the fluid back to the high-pressure fluid side through the pressure release groove connected to the high-pressure fluid side.

In the sliding surface 2 of the sliding component 1 shown in FIGS. 1 and 2, eight Rayleigh step mechanisms 3 and reverse Rayleigh step mechanisms 4 are provided in parallel in the circumferential direction so as to constitute pairs. There are many variations of the numbers and combinations of the Rayleigh step mechanisms 3 and the reverse Rayleigh step mechanisms 4, and preferred examples are described hereinafter.

The depths and widths of the groove parts 5, 6 and the radial-direction grooves 7, 51, the diameter of the communication hole 52, and the width of an internal peripheral seal surface 8 are properties that are suitably determined according to the diameter of the sliding component 1, the sliding surface width, the relative movement rate, the conditions of sealing and lubrication, and other factors.

As one example, in a case in which the diameter of the sliding component 1 is approximately 20 mm and the sliding surface width is approximately 2 mm, the widths of the groove parts 5 and 6 are 0.4 to 0.6 mm, the depths are several microns, the width of the internal peripheral seal surface 8 is 0.2 to 0.4 mm, the width of the radial-direction groove 7 (the angle in the circumferential direction) is approximately 6°, and the depth is several dozen microns.

Figure 5:
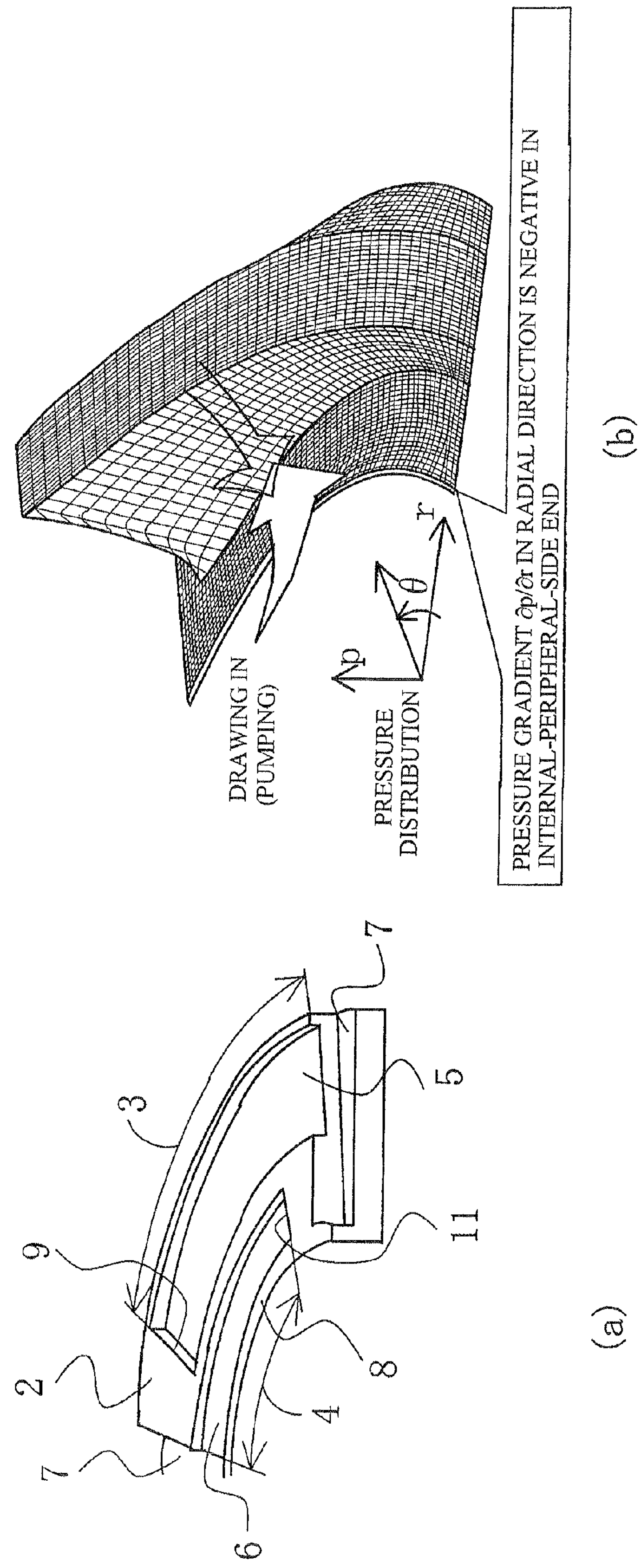
FIG. 5 illustrates the results of a numerical analysis of pressure distribution in the sliding surface of the sliding component according to Embodiment 1 of the present invention, wherein (a) is a partial perspective view of the sliding surface and (b) is a pressure distribution drawing thereof.

FIG. 5 shows the results of a numerical analysis of pressure distribution in the sliding surface of the sliding component according to Embodiment 1, wherein (a) is a partial perspective view of the sliding surface and (b) is a pressure distribution drawing.

As shown in FIG. 5(*b*), positive pressure is generated in the sliding surface 2, but since the reverse Rayleigh step mechanism 4 is provided in the internal peripheral side, cavitation occurs as a result of negative pressure being generated by the reverse Rayleigh step mechanism 4. Since the cavitation internal pressure is a negative pressure lower than atmospheric pressure, the pressure gradient $\partial p/\partial r$ is negative in the low-pressure-side end, the fluid moves from the high-pressure side to the low-pressure side, and as a result, drawing in (pumping) occurs in the internal peripheral side of the sliding surface. To describe this phenomenon in further detail, in the low-pressure-side seal surface 8, the pressure in the reverse Rayleigh step mechanism 4 is lower than the low-pressure-side fluid pressure (atmospheric pressure). As a result, the fluid flows from the constant-pressure fluid side into the reverse Rayleigh step mechanism 4 via the low-pressure-side seal surface 8, and as a result of this, drawing in (pumping) occurs in the internal peripheral side of the sliding surface.

Figure 6:
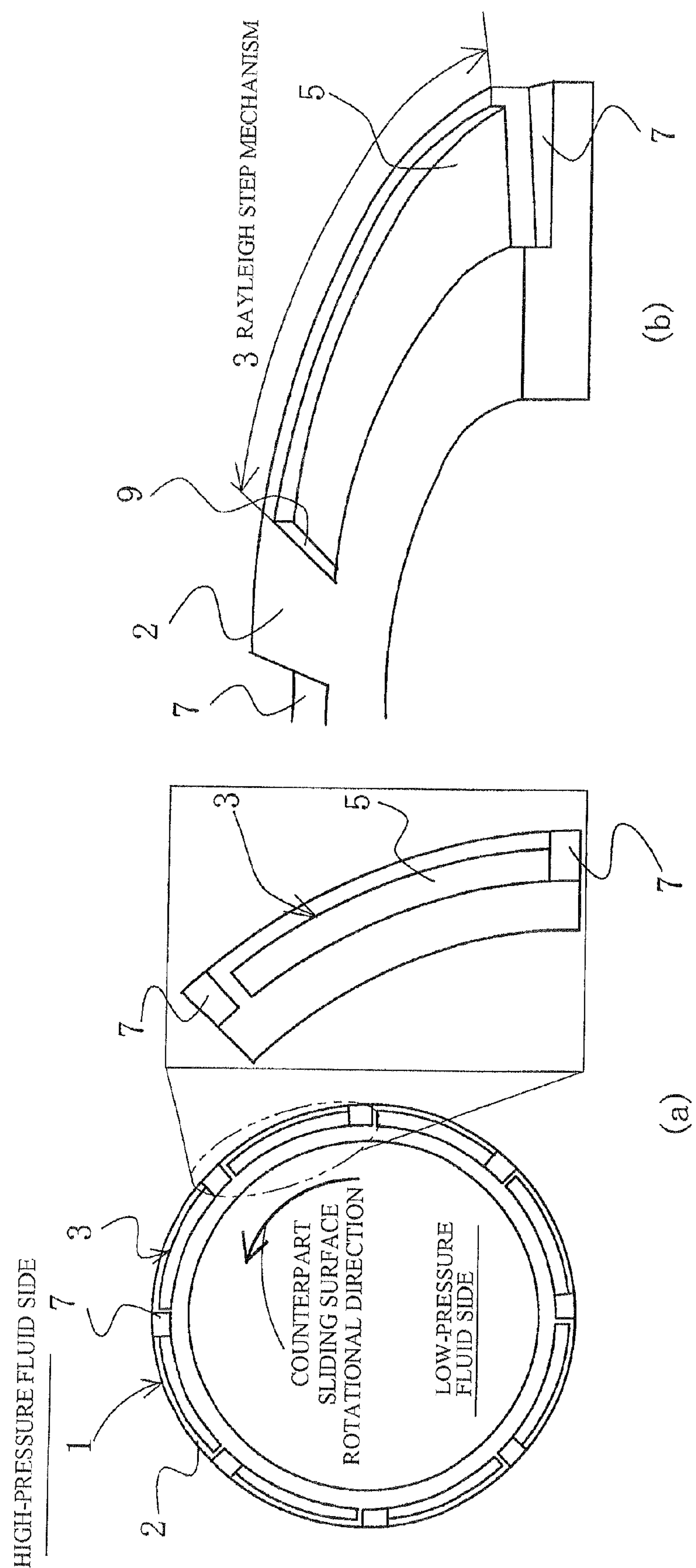
FIG. 6 illustrates the sliding surface of the sliding component of the comparative example, wherein (a) is a plan view of the sliding surface and (b) is a perspective view showing an enlargement of part of the sliding surface.

To further clarify the effects caused by providing the reverse Rayleigh step mechanism 4 to the internal peripheral side of the sliding surface, an example of a sliding surface not provided with the reverse Rayleigh step mechanism 4 (a comparative example) is shown in FIG. 6.

FIG. 6 is for describing the sliding surface of the comparative example, wherein (a) is a plan view of the sliding surface and (b) is a perspective view showing an enlargement of part of the sliding surface.

In the comparative example, only a Rayleigh step mechanism 3 is provided to the external peripheral side of the sliding surface.

Through relative movement with a counterpart sliding surface, dynamic pressure (positive pressure) is generated by the Rayleigh step mechanism 3.

Figure 7:
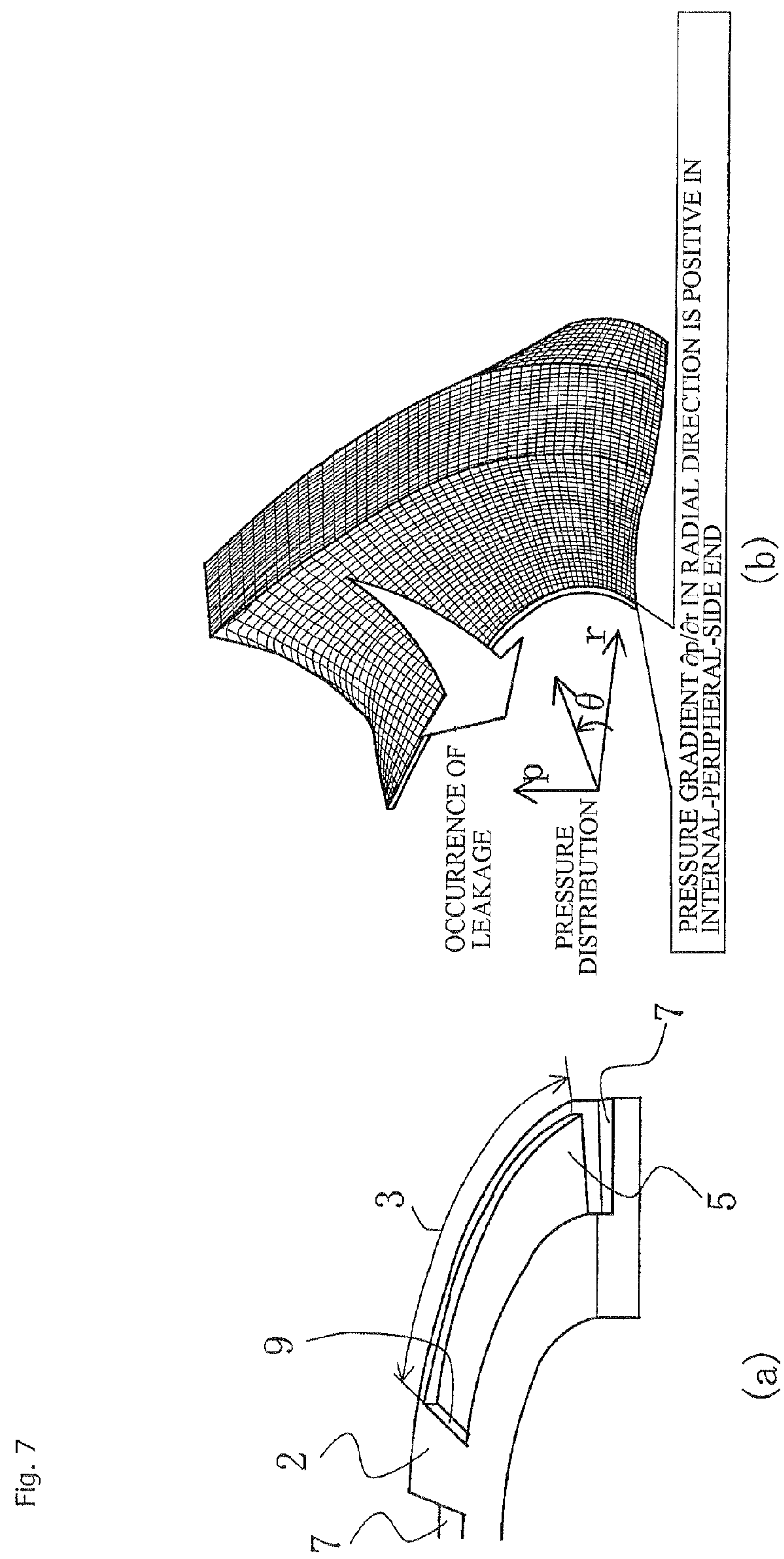
FIG. 7 illustrates the results of a numerical analysis of pressure distribution in the sliding surface of the sliding component of the comparative example, wherein (a) is a partial perspective view of the sliding surface and (b) is a pressure distribution drawing thereof.

FIG. 7 shows the results of a numerical analysis of pressure distribution in the sliding component of the comparative example, wherein (a) is a partial perspective view of the sliding surface and (b) is a pressure distribution drawing.

In the case of the comparative example as shown in FIG. 7(*b*), positive pressure is generated in the sliding surface by the Rayleigh step 9, and the fluid pressure in the sliding surface is higher than in the low-pressure fluid side. Specifically, in the internal peripheral end of the sliding surface, the pressure gradient $\partial p/\partial r$ is positive and the fluid moves from the high-pressure side of the sliding surface to the low-pressure side; therefore, as a result, leakage occurs from the high-pressure fluid side to the low-pressure fluid side.

Figure 8:
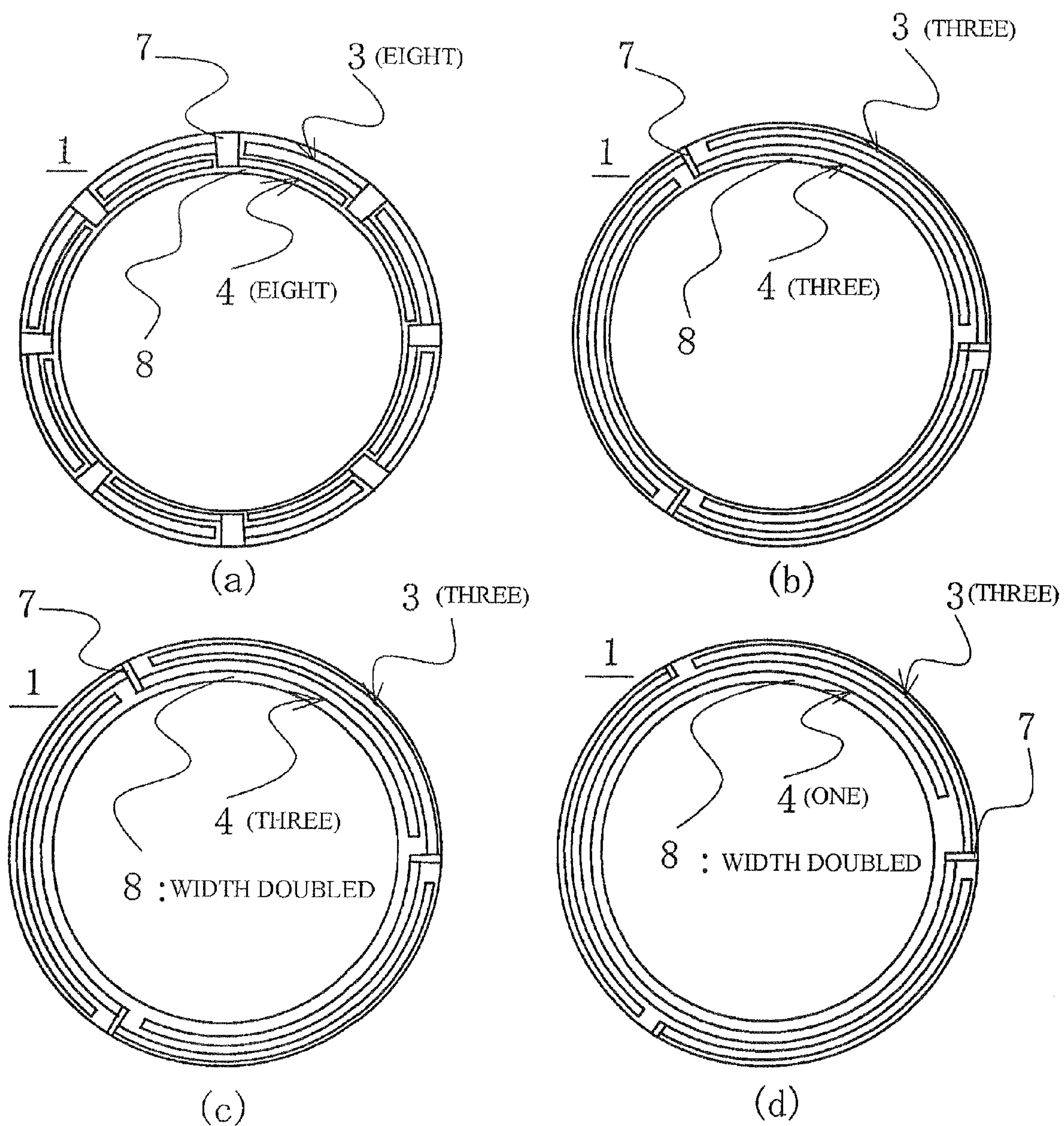
FIG. 8 illustrates various examples of the numbers and combinations of Rayleigh step mechanisms as positive pressure generating mechanisms and reverse Rayleigh step mechanisms as negative pressure generating mechanisms according to Embodiment 1 of the present invention.

FIG. 8 shows various examples of the numbers and combinations of Rayleigh step mechanisms 3 as positive pressure generating mechanisms and reverse Rayleigh step mechanisms 4 as negative pressure generating mechanisms in Embodiment 1 of the present invention.

In FIG. 8(*a*); there are eight Rayleigh step mechanisms 3 and eight reverse Rayleigh step mechanisms 4, and in FIG. 8(*b*), there are three Rayleigh step mechanisms 3 and three reverse Rayleigh step mechanisms 4.

In FIG. 8(*c*) there are three Rayleigh step mechanisms 3 and three reverse Rayleigh step mechanisms 4 and the width w of the internal-peripheral-side seal surface 8 is doubled, and in FIG. 8(*d*), there are three Rayleigh step mechanisms 3 and one reverse Rayleigh step mechanism 4 and the width w of the internal-peripheral-side seal surface 8 is doubled.

FIG. 9 shows examples of combinations of the spiral groove 12 as a positive pressure generating mechanism and a reverse Rayleigh step mechanism 4 as a negative pressure generating mechanism according to Embodiment 1 of the present invention.

In FIG. 9(*a*), the spiral groove 12 is provided over the entire periphery, excluding the portion of the radial-direction groove 7, of the high-pressure side of the external peripheral side and is directly communicated with the high-pressure fluid, and one reverse Rayleigh step mechanism 4 is provided to the low-pressure side of the internal peripheral side.

In FIG. 9(*b*), the spiral groove 12 is provided over the entire periphery, excluding the portion of the radial-direction groove 7, of the high-pressure side of the external peripheral side and is directly communicated with the high-pressure fluid, and four reverse Rayleigh step mechanisms 4 are provided to the low-pressure side of the internal peripheral side.

Figure 10:
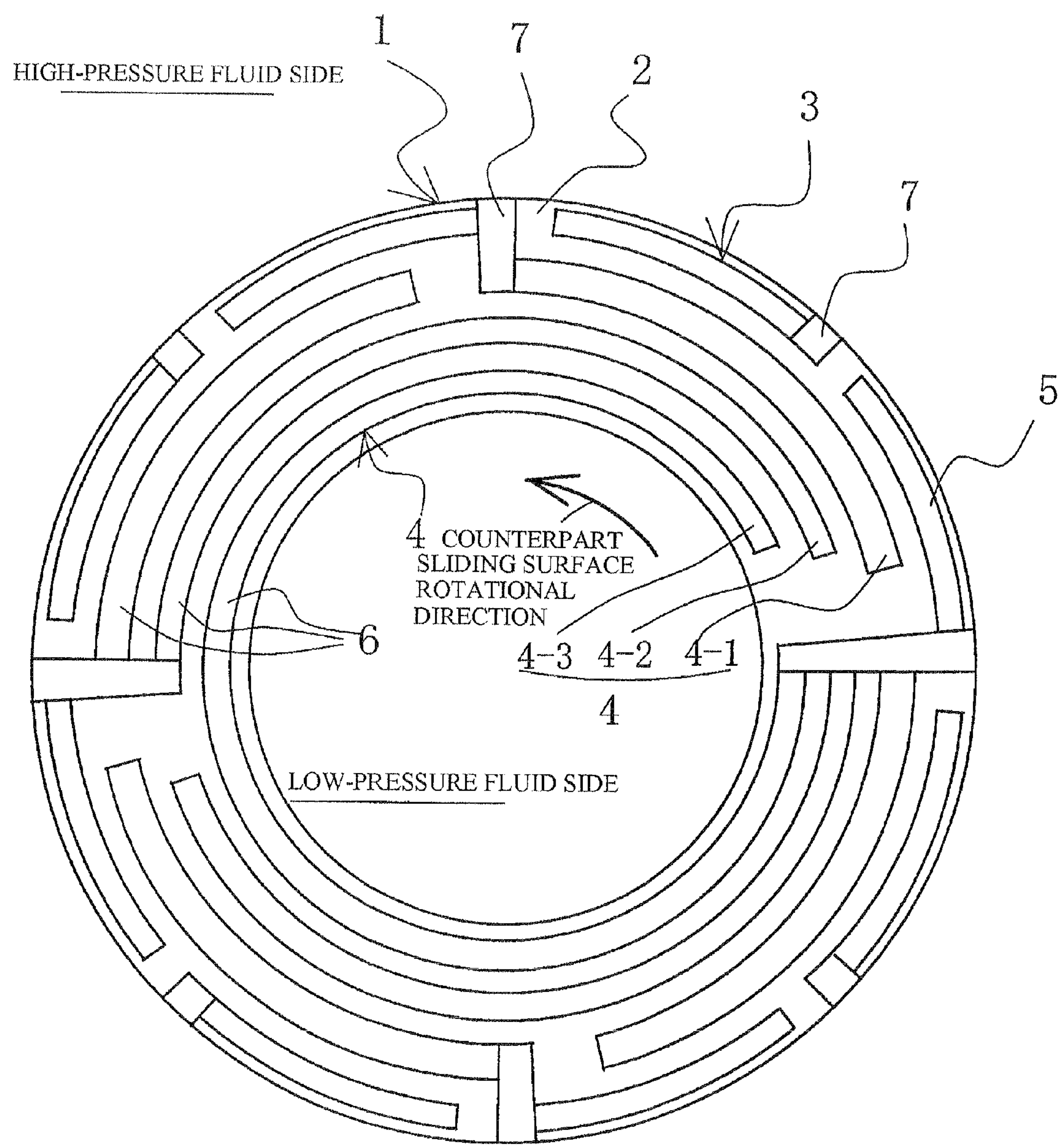
FIG. 10 illustrates an example in which a plurality of reverse Rayleigh step mechanisms are provided in the radial direction in a combination of Rayleigh step mechanisms as positive pressure generating mechanisms and reverse Rayleigh step mechanisms as negative pressure generating mechanisms according to Embodiment 1 of the present invention.

FIG. 10 shows an example in which a plurality of reverse Rayleigh step mechanisms are provided in the radial direction in a combination of Rayleigh step mechanisms as positive pressure generating mechanisms and reverse Rayleigh step mechanisms as negative pressure generating mechanisms according to Embodiment 1 of the present invention.

In the sliding surface 2 of the sliding component 1, positive pressure generating mechanisms 3 composed of Rayleigh step mechanisms or other positive pressure generating grooves are provided in the external peripheral side, and negative pressure generating mechanisms 4 composed of reverse Rayleigh step mechanisms or other negative pressure generating grooves are provided in the internal peripheral side. In FIG. 10, there are eight Rayleigh step mechanisms 3 in the external peripheral side, three rows of internal peripheral reverse Rayleigh step mechanisms 4 are provided in the radial direction; there are four radially outer reverse Rayleigh step mechanisms 4-1, two radially intermediate reverse Rayleigh step mechanisms 4-2, and one radially inner reverse Rayleigh step mechanism 4-3; and eight radial-direction grooves 7 are provided at equally spaced intervals in the circumferential direction.

In the case of the present example, since a plurality of reverse Rayleigh step mechanisms 4 are provided in the radial direction, the result is a structure in which negative pressure is generated incrementally and leakage can be better prevented. Consequently, this approach is applicable to high-pressure, high-speed sealing.

Figure 11:
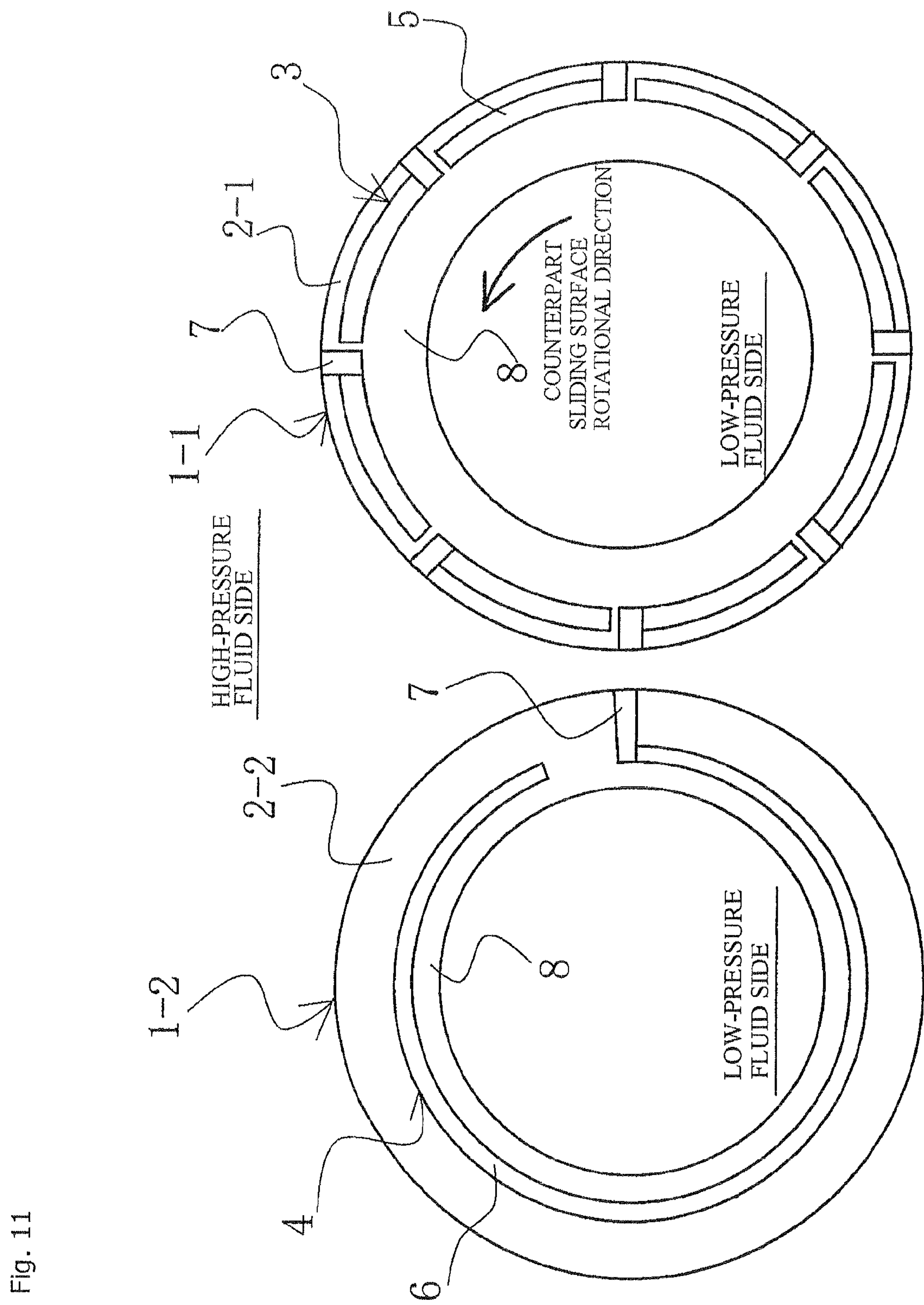
FIG. 11 illustrates an example in which a positive pressure generating mechanism is provided to one sliding surface, and a negative pressure generating mechanism is provided to another sliding surface, in Embodiment 1 of the present invention.

FIG. 11 shows an example in which a positive pressure generating mechanism is provided to one sliding surface, and a negative pressure generating mechanism is provided to another sliding surface, in Embodiment 1 of the present invention.

In FIG. 11, in a pair of sliding components 1-1 and 1-2, a Rayleigh step mechanism 3 as a positive pressure generating mechanism is provided to the sliding surface 2-1 of one sliding component 1-1, and a reverse Rayleigh step mechanism 4 as a negative pressure generating mechanism is provided to the sliding surface 2-2 of another sliding component 1-2.

Thus, even in cases in which the Rayleigh step mechanism 3 as a positive pressure generating mechanism and the reverse Rayleigh step mechanism 4 as a negative pressure generating mechanism are provided to separate sliding surfaces, there is no leakage when no motion is occurring, the pressure gradient $\partial p/\partial r$ of the low-pressure-side ends of the sliding surfaces can always be made negative including at the start of relative sliding, a pumping action occurs from the low-pressure side of the sliding surface toward the high-pressure fluid side, and the effect of significantly reducing the leakage rate can be achieved, similar to cases in which the Rayleigh step mechanism 3 as a positive pressure generating mechanism and the reverse Rayleigh step mechanism 4 as a negative pressure generating mechanism are provided to the same sliding surface. In addition, since there is more space than in cases in which the Rayleigh step mechanism 3 and the reverse Rayleigh step mechanism 4 are both provided to the same sliding surface, the mechanisms are more easily disposed in the sliding surfaces, and the machining timing can be shortened.

In cases in which the external peripheral sides of the pair of sliding components are the high-pressure fluid sides and the internal peripheral sides are the low-pressure fluid sides, due to positive pressure generating mechanisms for actuating the sliding surfaces in a state of fluid lubrication being provided to the static sides in the pair of sliding components 1-1 and 1-2, the fluid used in lubrication is less susceptible to the effects of centrifugal force from rotation, an appropriate amount of fluid can be ensured between the sliding surfaces, and a better state of fluid lubrication can therefore be achieved.

FIG. 12 is a chart showing the relationship between pressure and leakage rate in the examples (a) through (d) in the embodiment of the present invention shown in FIG. 8 and in the comparative example shown in FIG. 6.

The leakage rate of the comparative example was by far the highest, and the leakage rates of the examples (a) through (d)

in the embodiment shown in FIG. 8 was low, from which it is clear that a reverse Rayleigh step mechanism contributes to reducing the leakage rate.

In the examples (a) through (d) in the embodiment shown in FIG. 8, the leakage rate was the lowest in the case of example (d), in which there were three Rayleigh step mechanisms and one reverse Rayleigh step mechanism, and the width w of the seal surface on the internal peripheral side was doubled. It is also clear that the leakage rate was low even at a high pressure in the case of example (c), in which there were three Rayleigh step mechanisms and three reverse Rayleigh step mechanisms, and the width w of the seal surface on the internal peripheral side was doubled. In the case of example (a), in which there were eight Rayleigh step mechanisms and eight reverse Rayleigh step mechanisms, the leakage rate increased rapidly when the pressure increased. From the examples described above, it is clear that the fewer the radial-direction grooves 7 (the fewer the reverse Rayleigh step mechanisms) and the greater the width w of the seal surface on the internal peripheral side, the lower the leakage rate.

[Embodiment 2]

Figure 13:
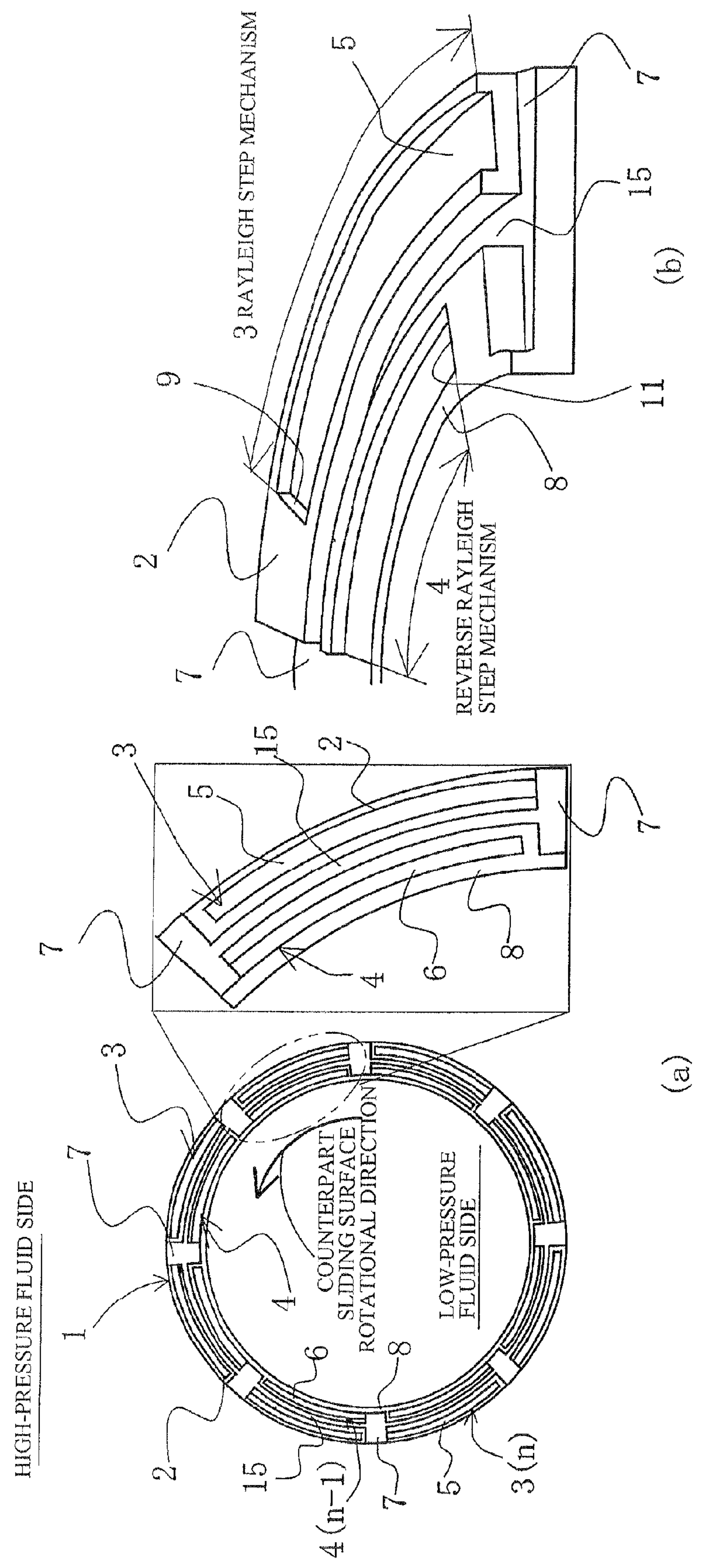
FIG. 13 illustrates the sliding surface of the sliding component according to Embodiment 2 of the present invention, wherein (a) is a plan view of the sliding surface and (b) is a perspective view showing an enlargement of part of the sliding surface.

FIG. 13 is for describing the sliding surface 2 of the sliding component 1 according to Embodiment 2 of the present invention, wherein (a) is a plan view of the sliding surface 2 and (b) is a perspective view showing an enlargement of part of the sliding surface 2.

In FIG. 13, the same symbols as those of Embodiment 1 indicate the same members as Embodiment 1, and detailed descriptions are omitted. In FIG. 13, the rotational direction of the counterpart sliding component opposing the annular sliding component 1 is a counterclockwise direction. This is the same even if the sliding component 1 rotates in a clockwise direction.

The external peripheral side of the sliding surface 2 of the sliding component 1 is provided with a positive pressure generating groove 3 composed of a Rayleigh step mechanism, a modified Rayleigh step mechanism, a spiral groove, a dimple, or the like; and the internal peripheral side is provided with a negative pressure generating mechanism 4 composed of a reverse Rayleigh step mechanism, a modified reverse Rayleigh step mechanism, a reverse spiral groove, or the like.

The description on FIG. 13 uses a Rayleigh step mechanism as an example of a positive pressure generating mechanism 3, and a reverse Rayleigh step mechanism as an example of a negative pressure generating mechanism 4.

A pressure release groove 15 is provided between the Rayleigh step mechanism 3 and the reverse Rayleigh step mechanism 4. The pressure release groove 15 is for releasing the dynamic pressure (positive pressure) generated in the high-pressure-side positive pressure generating mechanism, e.g., the Rayleigh step mechanism 3 to the pressure of the high-pressure fluid, and thereby preventing fluid from flowing into the low-pressure-side negative pressure generating mechanism, e.g., the reverse Rayleigh step mechanism 4 and weakening the negative-pressure-generating capability of the negative pressure generating mechanism. Fluid attempting to flow to the low-pressure fluid side due to the pressure generated in the high-pressure-side positive pressure generating mechanism is led to the pressure release groove 15, which fulfills the role of letting the fluid into the high-pressure fluid side.

The pressure release groove 15 is formed from a circular groove, and is disposed between the Rayleigh step mechanism 3 and the reverse Rayleigh step mechanism 4 and separated from the two mechanisms by predetermined sliding surface widths. The depth of the circular groove is approximately the same depth as the radial-direction groove 7 and the width is sufficient to release high pressures, for example, and part of the groove is connected to the high-pressure fluid side. In FIG. 13, the Rayleigh step mechanism 3, the reverse Rayleigh step mechanism 4, and the pressure release groove 15 are communicated with the high-pressure fluid side via the radial-direction groove 7, and are separated from the low-pressure fluid side by the seal surface 8. Specifically, the radial-direction groove 7 communicates the Rayleigh step mechanism 3, the reverse Rayleigh step mechanism 4, and the pressure release groove 15 with the high-pressure fluid side but prevents their being communicated with the low-pressure fluid side.

In FIG. 13, a plurality of Rayleigh step mechanisms 3 and reverse Rayleigh step mechanisms 4 are provided on either side of the pressure release groove 15 so as to be parallel in the circumferential direction and constitute pairs. As seen from the upstream side, the upstream end of the groove part 5 of the $n^{th}$ Rayleigh step mechanism 3 (*n*) and the downstream end of the groove part 6 of the $n-1^{th}$ reverse Rayleigh step mechanism 4 (*n*−1) are formed so as to substantially coincide in a position in the circumferential direction, and the groove parts 5, 6 and the pressure release groove 15 are communicated with the high-pressure fluid side via the shared radial-direction groove 7.

Figure 14:
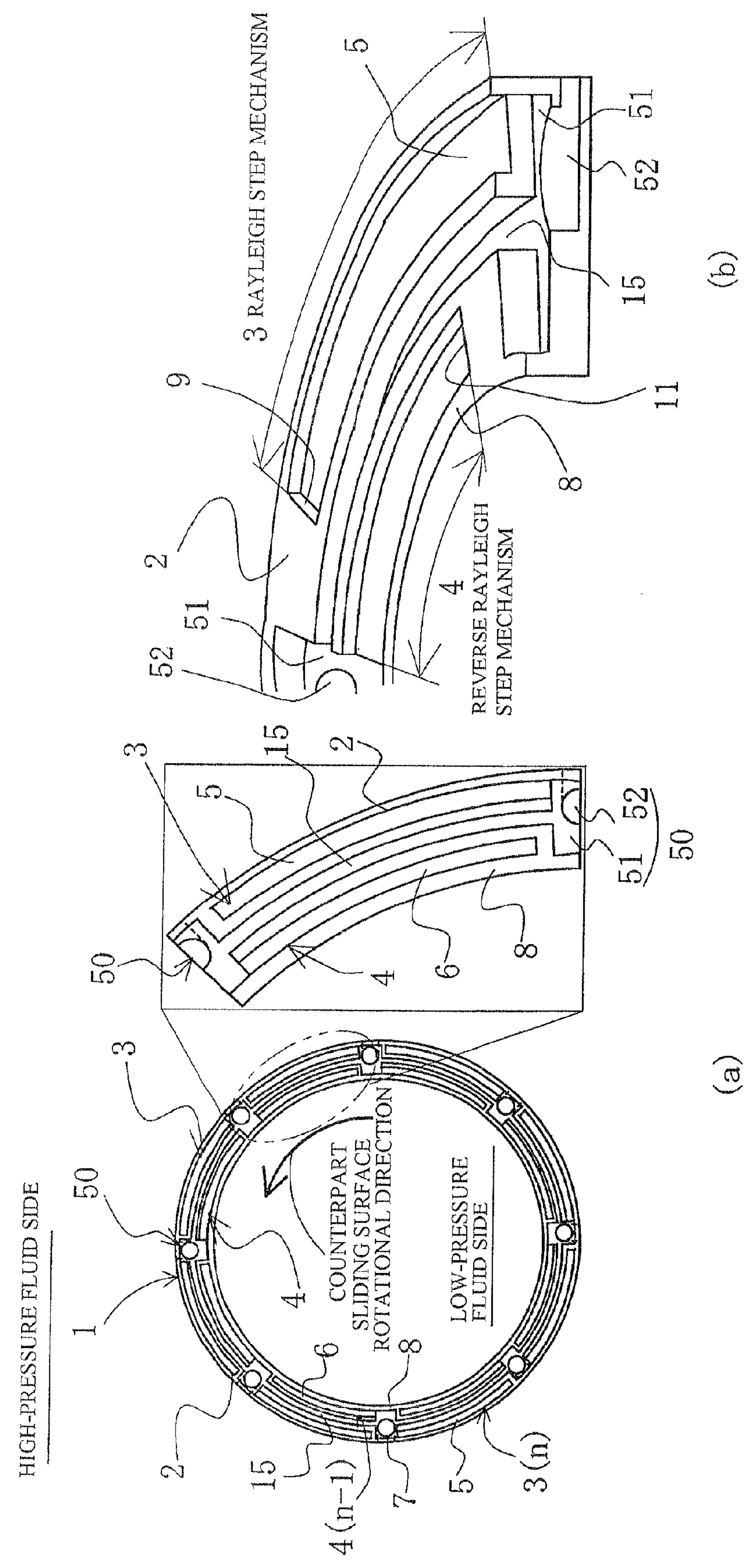
FIG. 14 is a drawing showing a modification of FIG. 13.

FIG. 14 is a drawing showing a modification of FIG. 13, symbols in FIG. 14 that are the same as FIG. 13 indicate the same symbols as FIG. 13, and detailed descriptions are omitted.

In FIG. 14, the means for communicating the groove parts 5, 6 with the high-pressure fluid side is different from that of FIG. 13, and the communication means 50 is configured from the radial-direction groove 51 and the communication hole 52 not communicated with high-pressure fluid side by the sliding surface 2. Specifically, the radial-direction groove 51 of FIG. 14 is not directly communicated with the high-pressure fluid side as is the radial-direction groove 7 of FIG. 13, the radial-direction groove 51 itself is formed so as to not be communicated with high-pressure fluid side by the sliding surface 2, and the groove parts 5, 6 are communicated with high-pressure fluid side by the communication hole 52 that joins the radial-direction groove 51 and the high-pressure fluid side. The communication hole 52, being curved at a substantially right angle from the radial-direction groove 51 as shown in FIG. 14(*b*), is designed so as to be communicated with the high-pressure fluid side positioned on the external peripheral side of the sliding component 1, but is not limited to such and may be provided facing outward at a slant. In cases in which the high-pressure fluid side is positioned on the internal peripheral side of the sliding component 1, the communication hole could be formed facing inward at a slant.

FIG. 15 shows various examples of combinations of Rayleigh step mechanisms 3 and spiral grooves 12 as positive pressure generating mechanisms, and reverse Rayleigh step mechanisms 4 and reverse spiral grooves 14 as negative pressure generating mechanisms, according to Embodiment 2 of the present invention.

In FIG. 15, the rotational direction of the counterpart sliding surface is the same counterclockwise direction as FIG. 13.

In FIG. 15(*a*), there are eight Rayleigh step mechanisms 3 disposed on the external peripheral high-pressure side of the sliding component 1 and one reverse Rayleigh step mechanism 4 disposed on the internal peripheral low-pressure side, between which the pressure release groove 15 is disposed.

In FIG. 15(*b*), there are eight Rayleigh step mechanisms 3 disposed on the external peripheral high-pressure side of the sliding component 1 and eight reverse Rayleigh step mechanisms 4 disposed on the internal peripheral low-pressure side, between which the pressure release groove 15 is disposed.

In FIG. 15(*c*), there are eight Rayleigh step mechanisms 3 disposed on the external peripheral high-pressure side of the sliding component 1 and a reverse spiral groove 14 provided around the entire periphery of the internal peripheral low-pressure side, between which the pressure release groove 15 is disposed.

In FIG. 15(*d*), a spiral groove 12 is provided around the entire periphery of the external peripheral high-pressure side of the sliding component 1 and one reverse Rayleigh step mechanism 4 is disposed on the internal peripheral low-pressure side, between which the pressure release groove 15 is disposed.

In FIG. 15(*e*), a spiral groove 12 is provided around the entire periphery of the external peripheral high-pressure side of the sliding component 1 and eight reverse Rayleigh step mechanisms 4 are disposed on the internal peripheral low-pressure side, between which the pressure release groove 15 is disposed.

In FIG. 15(*f*), a spiral groove 12 is provided around the entire periphery of the external peripheral high-pressure side of the sliding component 1 and a reverse spiral groove 14 is provided around the entire periphery of the internal peripheral low-pressure side, between which the pressure release groove 15 is disposed. In this case, the pressure release groove 15 fulfills the role of releasing pressure to the high-pressure fluid side of the reverse spiral groove 14.

In FIGS. 15(*a*), (*b*), (*d*), and (*e*), the leakage rate is low in (a) and (d) in which the number of reverse Rayleigh step mechanisms 4 is low.

Figure 16:
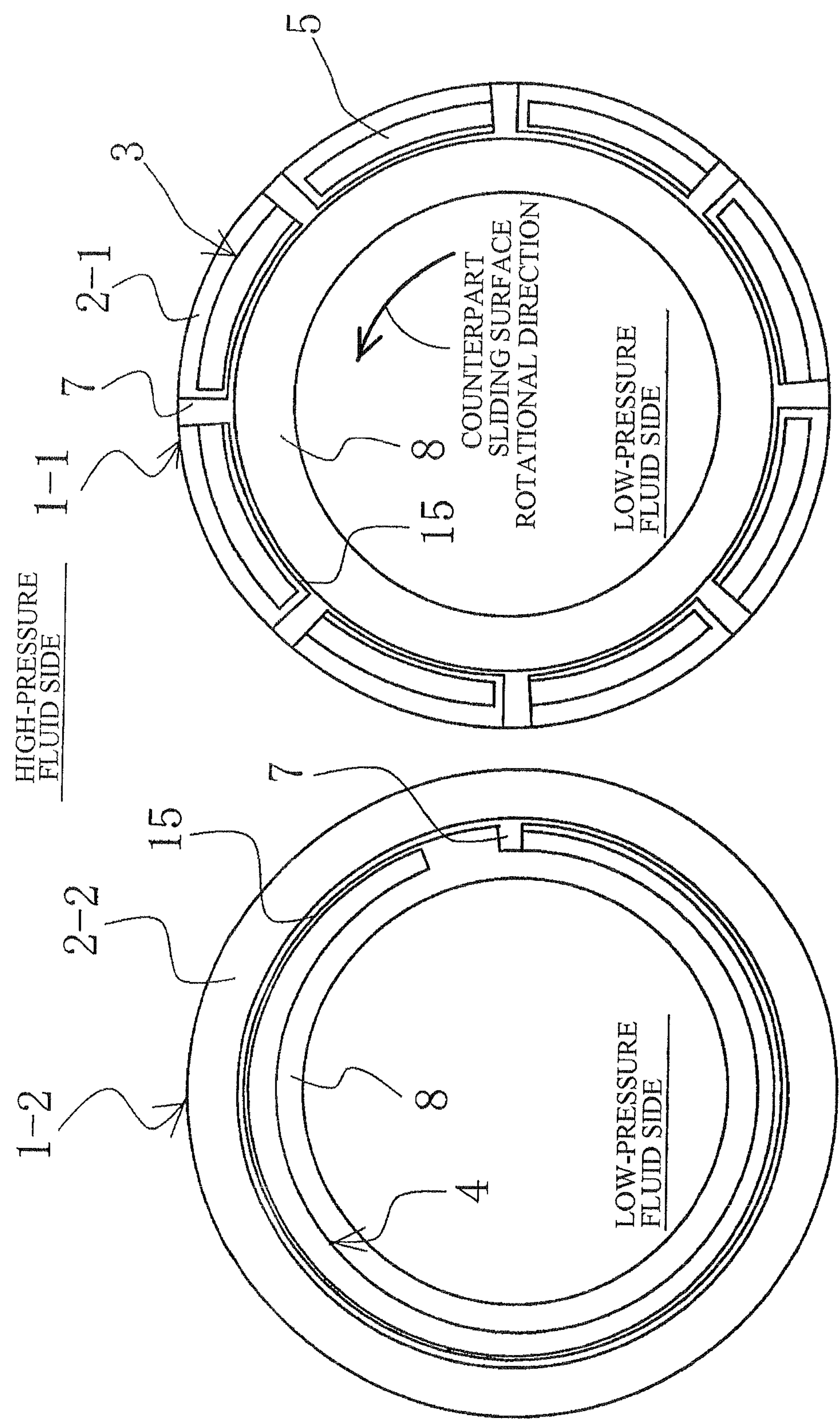
FIG. 16 illustrates an example in which a positive pressure generating mechanism is provided to one sliding surface and a negative pressure generating mechanism is provided to another sliding surface in Embodiment 2 of the present invention.

FIG. 16 shows an example in Embodiment 2 of the present invention, in which a positive pressure generating mechanism is provided to one sliding surface and a negative pressure generating mechanism is provided to another sliding surface.

In FIG. 16, among a pair of sliding components 1-1 and 1-2, a Rayleigh step mechanism 3 as a positive pressure generating mechanism is provided to the sliding surface 2-1 of one sliding component 1-1, and a reverse Rayleigh step mechanism 4 as a negative pressure generating mechanism is provided to the sliding surface 2-2 of the other sliding component 1-2.

Thus, even in cases in which a Rayleigh step mechanism 3 as a positive pressure generating mechanism and a reverse Rayleigh step mechanism 4 as a negative pressure generating mechanism are provided to separate sliding surfaces, there is no leakage when no motion is occurring, the pressure gradient $\partial p/\partial r$ of the low-pressure-side ends of the sliding surfaces can always be made negative including at the start of relative sliding, a pumping action occurs from the low-pressure side of the sliding surface toward the high-pressure fluid side, and the effect of significantly reducing the leakage rate can be achieved, similar to cases in which the Rayleigh step mechanism 3 as a positive pressure generating mechanism and the reverse Rayleigh step mechanism 4 as a negative pressure generating mechanism are provided to the same sliding surface. In addition, since there is more space than in cases in which the Rayleigh step mechanism 3 and the reverse Rayleigh step mechanism 4 are both provided to the same sliding surface, the mechanisms are more easily disposed in the sliding surfaces, and the machining timing can be shortened.

In cases in which the external peripheral sides of the pair of sliding components are the high-pressure fluid sides and the internal peripheral sides are the low-pressure fluid sides, due to positive pressure generating mechanisms for actuating the sliding surfaces in a state of fluid lubrication being provided to the static sides in the pair of sliding components 1-1 and 1-2, the fluid used in lubrication is less susceptible to the effects of centrifugal force from rotation, an appropriate amount of fluid can be ensured between the sliding surfaces, and a better state of fluid lubrication can therefore be achieved.

Figure 17:
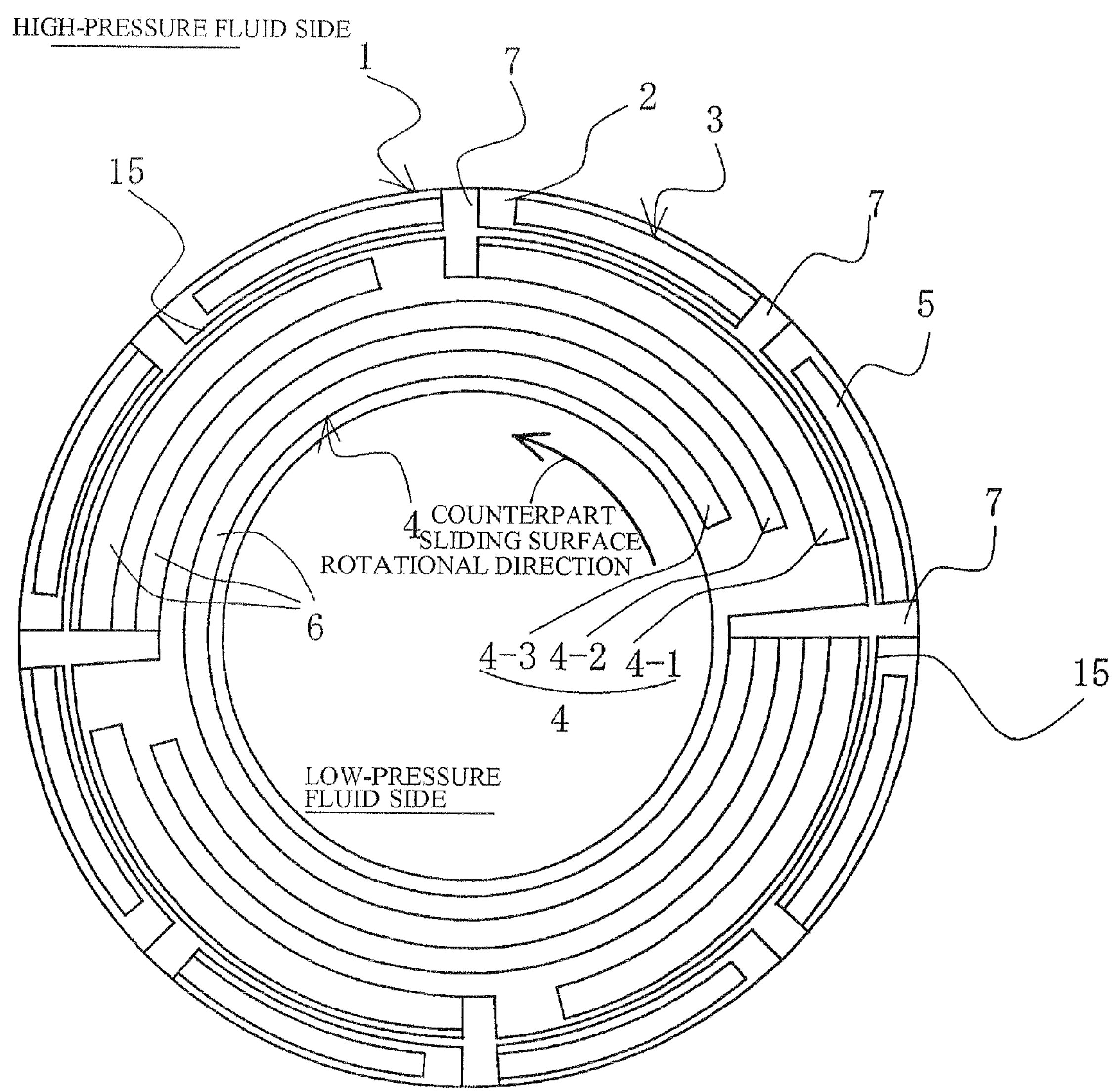
FIG. 17 illustrates an example in Embodiment 2 of the present invention, in which a plurality of reverse Rayleigh step mechanisms as negative pressure generating mechanisms are provided in the radial direction.

FIG. 17 shows an example in Embodiment 2 of the present invention, in which a plurality of reverse Rayleigh step mechanisms as a negative pressure generating mechanism are provided in the radial direction.

In FIG. 17, in the sliding surface 2 of the sliding component 1, the external peripheral side is provided with positive pressure generating mechanisms 3 composed of Rayleigh step mechanisms or other positive pressure generating grooves, and the internal peripheral side is provided with negative pressure generating mechanisms 4 composed of reverse Rayleigh step mechanisms or other negative pressure generating grooves. A pressure release groove 15 is provided between the Rayleigh step mechanisms 3 and the reverse Rayleigh step mechanisms 4. The pressure release groove 15 is for releasing the dynamic pressure (positive pressure) generated in the high-pressure-side positive pressure generating mechanisms, e.g., the Rayleigh step mechanisms 3 to the pressure of the high-pressure fluid, and thereby preventing fluid from flowing into the low-pressure-side negative pressure generating mechanisms, e.g., the reverse Rayleigh step mechanisms 4 and weakening the negative-pressure-generating capability of the negative pressure generating mechanisms. Fluid attempting to flow to the low-pressure fluid side due to the pressure generated in the high-pressure-side positive pressure generating mechanisms is led to the pressure release groove 15, which fulfills the role of letting the fluid into the high-pressure fluid side. In FIG. 17, there are eight Rayleigh step mechanisms 3 in the external peripheral side, three rows of internal peripheral reverse Rayleigh step mechanisms 4 are provided in the radial direction; there are four radially outer reverse Rayleigh step mechanisms 4-1, two radially intermediate reverse Rayleigh step mechanisms 4-2, and one radially inner reverse Rayleigh step mechanism 4-3; and eight radial-direction grooves 7 are provided at equally spaced intervals in the circumferential direction.

In the case of the present example, since a plurality of reverse Rayleigh step mechanisms 4 are provided in the radial direction, the result is a structure in which negative pressure is generated incrementally and leakage can be better prevented. Consequently, this approach is applicable to high-pressure, high-speed sealing.

Figure 18:
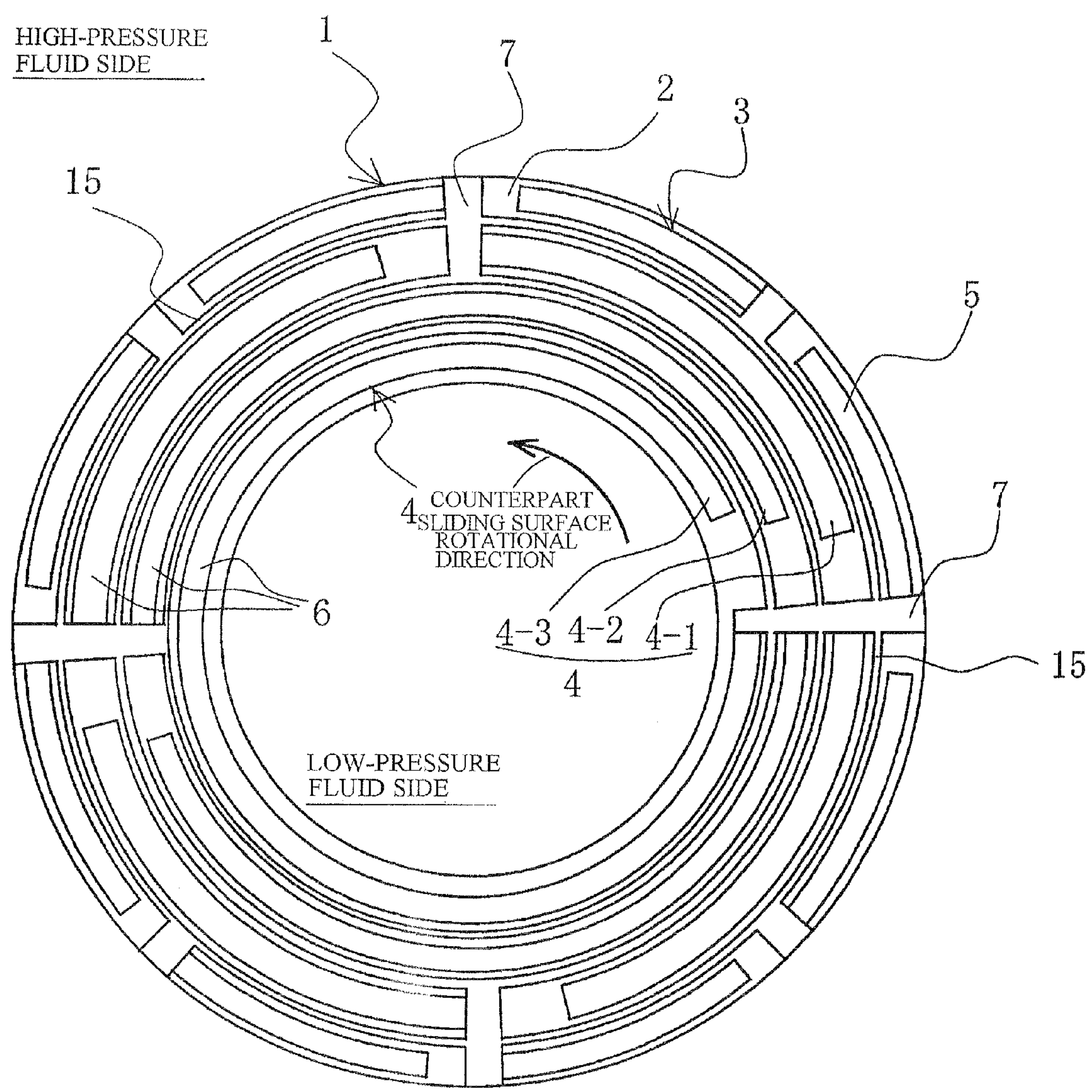
FIG. 18 shows a modification of FIG. 17, wherein a pressure release groove is provided between a plurality of reverse Rayleigh step mechanisms.

FIG. 18 shows a modification of FIG. 17, wherein a pressure release groove is provided between a plurality of reverse Rayleigh step mechanisms.

In FIG. 18, in the sliding surface 2 of the sliding component 1, the external peripheral side is provided with positive pressure generating mechanisms 3 composed of Rayleigh step mechanisms or other positive pressure generating grooves, and the internal peripheral side is provided with negative pressure generating mechanisms 4 composed of reverse Rayleigh step mechanisms or other negative pressure generating grooves. In FIG. 18, there are eight Rayleigh step mechanisms 3 in the external peripheral side, and three rows of internal peripheral reverse Rayleigh step mechanisms 4 are provided in the radial direction; there are four radially outer reverse Rayleigh step mechanisms 4-1, two radially intermediate reverse Rayleigh step mechanisms 4-2, and one radially inner reverse Rayleigh step mechanism 4-3; and eight radial-direction grooves 7 are provided at equally spaced intervals in the circumferential direction.

Respective pressure release grooves 15 are provided between the Rayleigh step mechanisms 3 and the radially external reverse Rayleigh step mechanisms 4-1, between the radially external reverse Rayleigh step mechanisms 4-1 and the radially intermediate reverse Rayleigh step mechanisms 4-2, and between the radially intermediate reverse Rayleigh step mechanisms 4-2 and the radially internal reverse Rayleigh step mechanisms 4-3.

Thus, since a plurality of reverse Rayleigh step mechanisms 4 as negative pressure generating mechanisms are provided in the radial direction and respective pressure release grooves 15 are provided between these mechanisms in the radial direction, negative pressure is generated incrementally, and in addition to the effect of better preventing leakage, also achieved is the effect of blocking the coming and going of fluid between the reverse Rayleigh step mechanisms 4 and impeding the occurrence of leakage.

Figure 19:
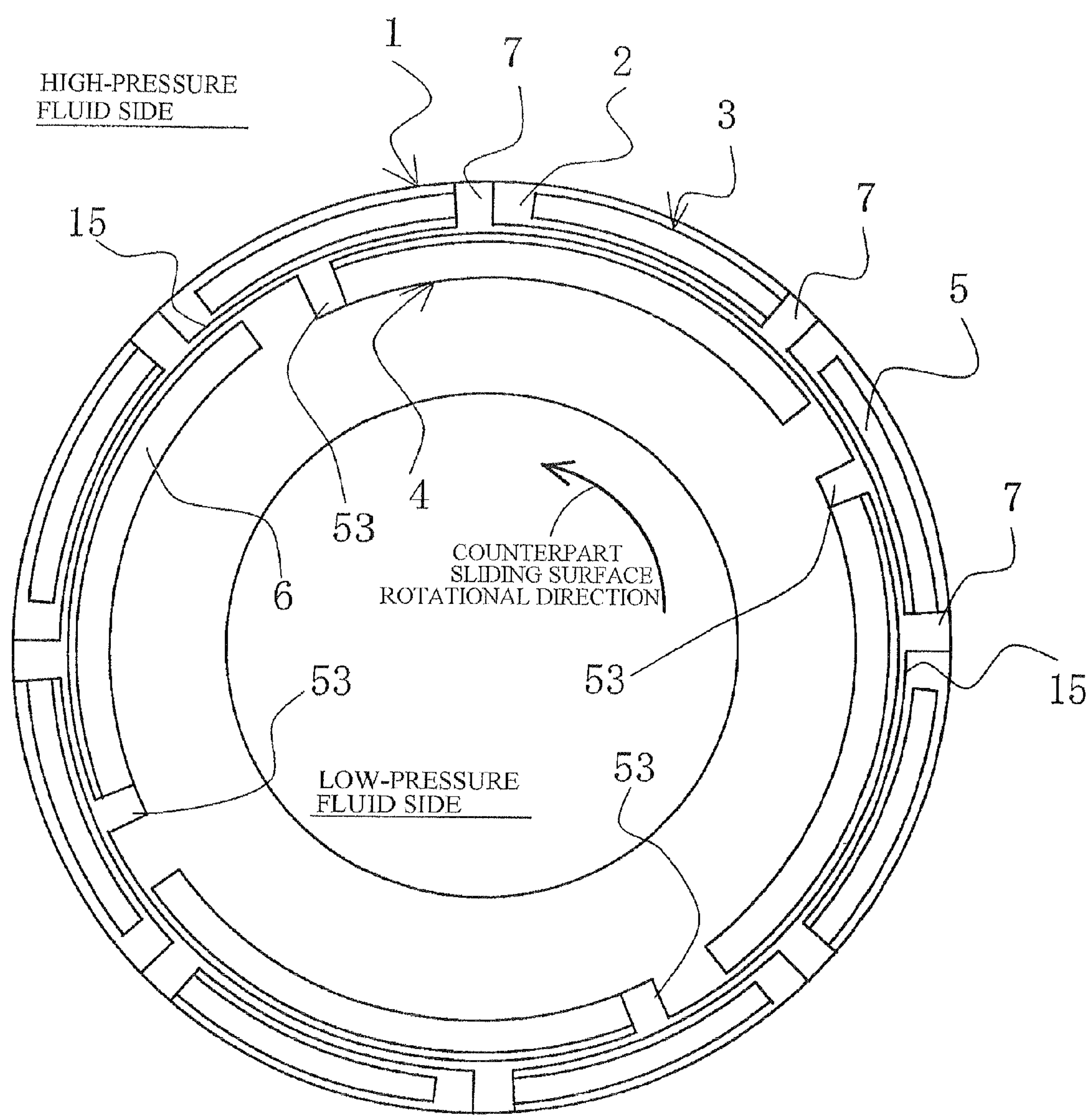
FIG. 19 illustrates an example in Embodiment 2 of the present invention in which Rayleigh step mechanisms as positive pressure generating mechanisms and reverse Rayleigh step mechanisms as negative pressure generating mechanisms are staggered in the circumferential direction.

FIG. 19 shows an example in Embodiment 2 of the present invention in which Rayleigh step mechanisms as positive pressure generating mechanisms and reverse Rayleigh step mechanisms as negative pressure generating mechanisms are staggered in the circumferential direction.

In FIG. 19, in the sliding surface 2 of the sliding component 1, positive pressure generating mechanisms 3 composed of Rayleigh step mechanisms or the like are provided in the external peripheral side, and negative pressure generating mechanisms 4 composed of reverse Rayleigh step mechanisms or the like are provided in the internal peripheral side. FIG. 19 shows a configuration in which there are eight external peripheral Rayleigh step mechanisms 3 and four internal peripheral reverse Rayleigh step mechanisms 4, and four radial-direction grooves 53 communicated with the reverse Rayleigh step mechanisms 4 are provided in positions that are circumferentially midway between each of the eight radial-direction grooves 7 communicated with the Rayleigh step mechanisms 3; wherein the Rayleigh step mechanisms 3 as positive pressure generating mechanisms and the reverse Rayleigh step mechanisms 4 as negative pressure generating mechanisms are staggered in the circumferential direction. Pressure release grooves 15 are also provided between the Rayleigh step mechanisms 3 and the reverse Rayleigh step mechanisms 4, and the four radial-direction grooves 53 are communicated with the eight radial-direction grooves 7 via the pressure release grooves 15. The radial-direction grooves 53 are disposed in the internal peripheral side and are not communicated directly with the high-pressure fluid side, but are communicated with the high-pressure fluid side via the pressure release grooves 15 and the radial-direction grooves 7. Thus, since the radial-direction grooves 53 communicated with the reverse Rayleigh step mechanisms 4 are not communicated directly with the high-pressure fluid side but are communicated with the high-pressure fluid side via the narrow pressure release grooves 15, the pressure of the radial-direction grooves 53 decreases and leakage from the radial-direction grooves 53 to the static-pressure fluid side is reduced.

Figure 20:
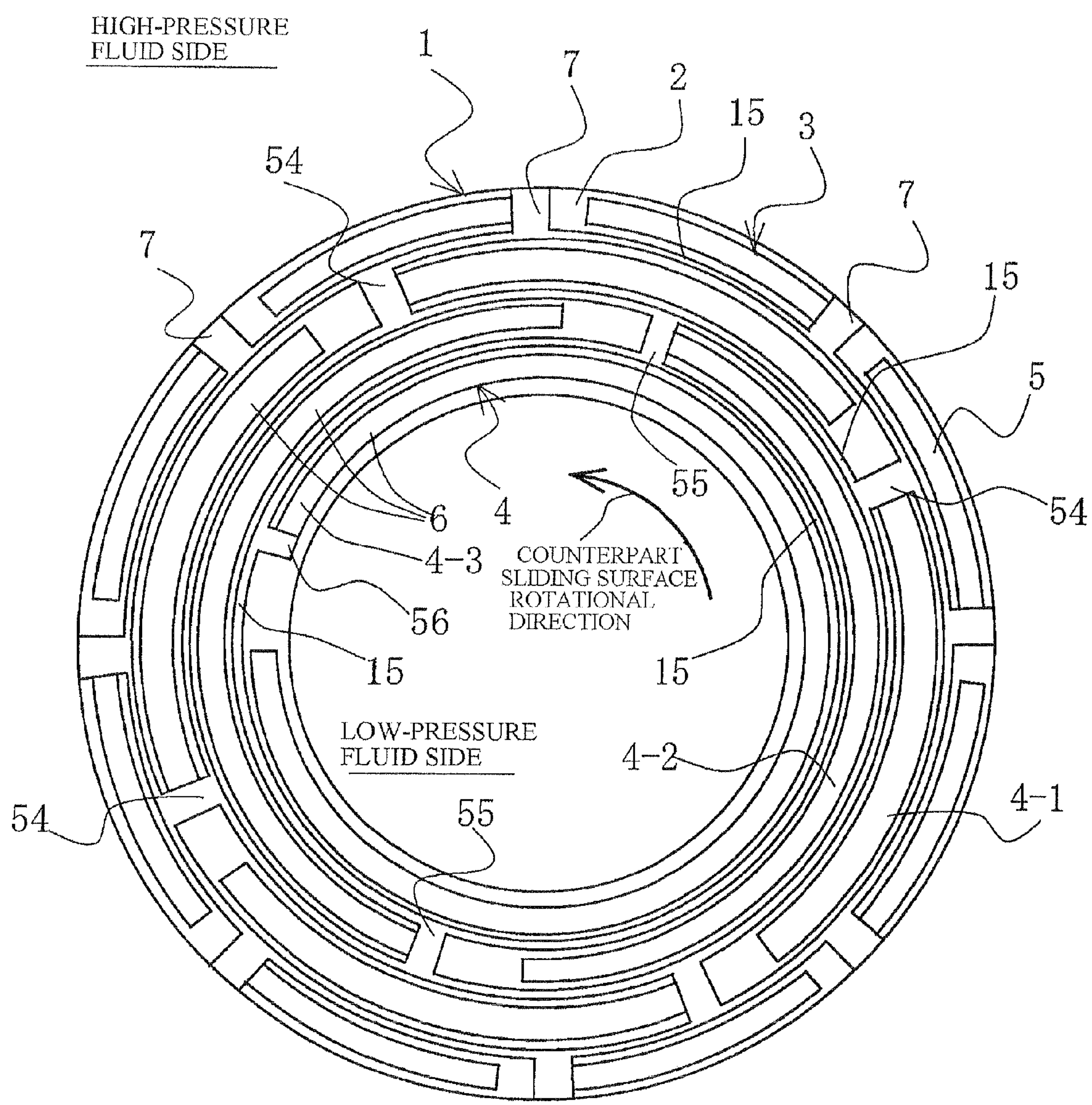
FIG. 20 illustrates an example in FIG. 19 in which a plurality of reverse Rayleigh step mechanisms as negative pressure generating mechanisms are provided in the radial direction.

FIG. 20 shows an example in FIG. 19 in which a plurality of reverse Rayleigh step mechanisms as negative pressure generating mechanisms are provided in the radial direction.

In FIG. 20, in the sliding surface 2 of the sliding component 1, positive pressure generating mechanisms 3 composed of Rayleigh step mechanisms or other positive pressure generating grooves are provided in the external peripheral side, and negative pressure generating mechanisms 4 composed of reverse Rayleigh step mechanisms or other negative pressure generating grooves are provided in the internal peripheral side. In FIG. 20, there are eight external peripheral Rayleigh step mechanisms 3, three rows of internal peripheral reverse Rayleigh step mechanisms 4 are provided in the radial direction, four radially outer reverse Rayleigh step mechanisms 4-1 are provided, two radially intermediate reverse Rayleigh step mechanisms 4-2 are provided, and one radially inner reverse Rayleigh step mechanism 4-3 is provided.

Respective pressure release grooves 15 are provided between the Rayleigh step mechanisms 3 and the radially outer reverse Rayleigh step mechanisms 4-1, between the radially outer reverse Rayleigh step mechanisms 4-1 and the radially intermediate reverse Rayleigh step mechanisms 4-2, and between the radially intermediate reverse Rayleigh step mechanisms 4-2 and the radially inner reverse Rayleigh step mechanism 4-3.

The eight external peripheral Rayleigh step mechanisms 3 are respectively communicated with the eight radial-direction grooves 7 directly communicated with the high-pressure fluid side, the four radially outer reverse Rayleigh step mechanisms 4-1 are respectively communicated with four radial-direction grooves 54 provided in the same circumferential formation, the two radially intermediate reverse Rayleigh step mechanisms 4-2 are respectively communicated with two radial-direction grooves 55 provided in the same circumferential formation, the one radially inner reverse Rayleigh step mechanism 4-3 is communicated with one radial-direction groove 56 provided in the same circumferential formation, and the radial-direction grooves 7, 54, 55, 56 of each row are disposed so that their positions are staggered in the circumferential direction. Therefore, the four radially outer reverse Rayleigh step mechanisms 4-1 are communicated with the high-pressure fluid side via the four radial-direction grooves 54 provided in the same circumferential formation, the pressure release groove 15, and the radial-direction grooves 7; the two radially intermediate reverse Rayleigh step mechanisms 4-2 are communicated with the high-pressure fluid side via the two radial-direction grooves 55 provided in the same circumferential formation, the pressure release groove 15, the radial-direction grooves 54, and the radial-direction grooves 7; and the one radially inner reverse Rayleigh step mechanism 4-3 is communicated with the high-pressure fluid side via the one radial-direction groove 56 provided in the same circumferential formation, the pressure release groove 15, the radial-direction grooves 55, 54, and the radial-direction grooves 7.

Thus, since the radial-direction grooves 7, 54, 55, 56 are provided in each row and the radial-direction grooves 7, 54, 55, 56 of each row are disposed so as to be staggered in the circumferential direction, the high-pressure fluid is not directly communicated with the internal peripheral side vicinity of the sliding surface via the radial-direction grooves, and leakage from the high-pressure fluid side to the low-pressure fluid side can therefore be better prevented.

[Embodiment 3]

Figure 21:
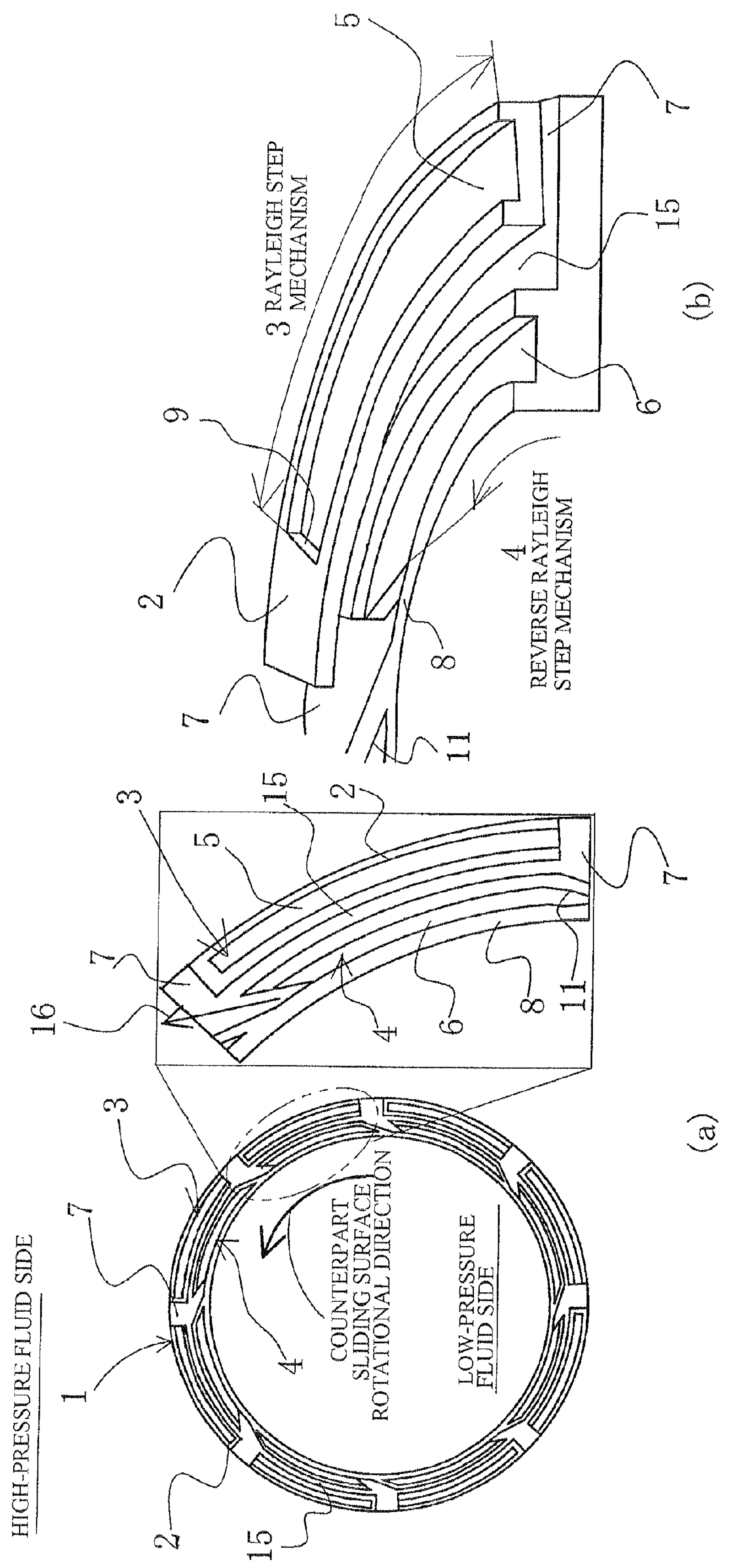
FIG. 21 is for describing the sliding surface of the sliding component according to Embodiment 3 of the present invention, wherein (a) is a plan view of the sliding surface and (b) is a perspective view showing an enlargement of part of the sliding surface.

FIG. 21 is for describing the sliding surface 2 of the sliding component 1 according to Embodiment 3 of the present invention, wherein (a) is a plan view of the sliding surface 2 and (b) is a perspective view showing an enlargement of part of the sliding surface 2.

In FIG. 21, the same symbols as those of Embodiments 1 and 2 indicate the same members as Embodiments 1 and 2, and detailed descriptions are omitted. In FIG. 21, the rotational direction of the counterpart sliding component opposing the annular sliding component 1 is a counterclockwise direction. This is the same even if the sliding component 1 rotates in a clockwise direction.

In Embodiment 1 described above, the concept that the smaller the number of reverse Rayleigh step mechanisms 4 (the smaller the number of radial-direction grooves 7) and the greater the width w of the internal-peripheral-side seal surface 8, the lower the leakage rate, is as described in Embodiment 1 and so forth. Needless to say, however, the number of radial-direction grooves 7 cannot be zero, and there is a certain limit on the width w of the internal-peripheral-side seal surface 8.

To reduce leakage from the radial-direction grooves 7 in Embodiment 3, whereas in Embodiments 1 and 2 the radial-direction grooves 7 were disposed in directions of 90° relative to the circumferential direction (the tangential direction), here the grooves are slanted in the rotational direction of the counterpart sliding surface and are disposed in a direction of expanding in a radial formation in the rotational direction of the counterpart sliding surface, as shown in FIG. 21.

In FIG. 21, in the sliding surface 2 of the sliding component 1, Rayleigh step mechanisms 3 as positive pressure generating mechanisms are provided in the external peripheral side, reverse Rayleigh step mechanisms 4 as negative pressure generating mechanisms are provided in the internal peripheral side, and a pressure release groove 15 is provided between the Rayleigh step mechanisms 3 and the reverse Rayleigh step mechanisms 4.

The groove parts 5 of the Rayleigh step mechanisms 3 and the groove parts 6 of the reverse Rayleigh step mechanisms 4 are communicated with the high-pressure fluid side via a shared radial-direction groove 7.

The radial-direction groove 7 is shaped so as to be slanted in the rotational direction of the counterpart sliding surface from the internal peripheral side toward the external peripheral side, and when a plurality of radial-direction grooves 7 are disposed in the circumferential direction, the grooves are disposed in a direction of expanding in a radial formation in the rotational direction of the counterpart sliding surface.

In the example of the radial-direction groove 7 shown in FIG. 21, the groove is shaped so as to be slanted in the rotational direction of the counterpart sliding surface from the internal peripheral side communicated with the groove parts 6 of the reverse Rayleigh step mechanisms 4 toward the pressure release groove 15 positioned in the external peripheral side, and in the portions of the Rayleigh step mechanisms 3 positioned in the outermost peripheral side of the radial direction, the groove is shaped facing in a direction 90° relative to the circumferential direction (the tangential direction). Therefore, fluid that flows from the groove parts 6 of the reverse Rayleigh step mechanisms 4 into the radial-direction groove 7 is expelled in the direction shown by the arrow 16.

As shall be apparent, the radial-direction groove 7 may be shaped so as to be uniformly slanted in the rotational direction of the counterpart sliding surface from the internal peripheral side communicated with the groove parts 6 of the reverse Rayleigh step mechanisms 4 up to the external-peripheral-side ends, but essentially the groove is preferably shaped so as to be slanted in the rotational direction of the counterpart sliding surface from the internal peripheral side toward the external peripheral side.

The greater the slanting angle of the radial-direction groove 7, the lesser the positive pressure gradient in the radial direction in the radial-direction groove 7 (a pressure gradient such that the pressure increases from the internal peripheral side toward the external peripheral side), and as a result, the lower the leakage rate from the radial-direction groove 7.

Furthermore, the width of the radial-direction groove 7 may be shaped so as to gradually expand from the internal peripheral side toward the external peripheral side.

Thus, due to the radial-direction groove 7 being disposed so as to be slanted in a direction of expanding in a radial formation in the rotational direction of the counterpart sliding surface, the internal peripheral side of the radial-direction groove 7 is closed off by the seal surface 8; therefore, the same negative pressure effect as with a reverse spiral groove occurs in the radial-direction groove 7, fluid leaking from the high-pressure side is drawn in, creating an action of pushing back to the high-pressure fluid side in a state of a lessened positive pressure gradient in the radial direction, and leakage from the radial-direction groove 7 is therefore reduced.

[Embodiment 4]

Figure 22:
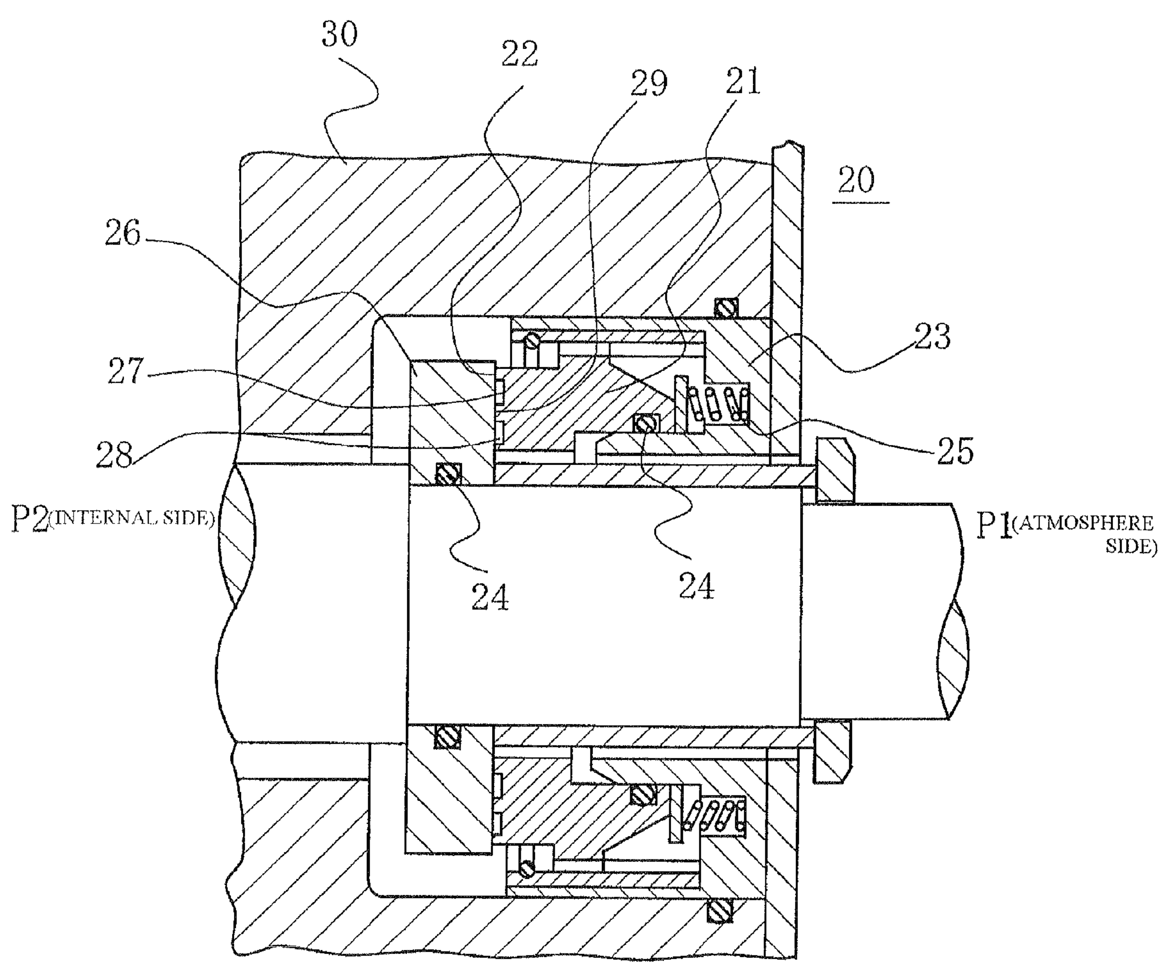
FIG. 22 is a cross-sectional view of a mechanical seal on which is mounted another sliding component paired with the sliding component, according to Embodiment 4 of the present invention.

FIG. 22 is a cross-sectional view of a mechanical seal on which is mounted another sliding component paired with the sliding component of the present invention.

In a mechanical seal 20, the sliding component 1 of the present invention is mounted as a fixing sealing ring 21. The fixing sealing ring 21 is movably mounted via an O ring 24 in a holding ring 23 secured to a housing 30. A rotational sealing ring 26, whose sliding surface 29 is ground down to a flat surface, is made to face the fixing sealing ring 21. The fixing sealing ring 21 creates a seal between an internal side P2 and an atmosphere side P1 while a sliding surface 22 is pressed and held firmly against the opposing sliding surface 29 by a spring 25. In the sliding surface 22 of the fixing sealing ring 21, the external peripheral side is provided with a positive pressure generating mechanism 27 composed of a Rayleigh step mechanism, a modified Rayleigh step mechanism, a spiral groove, a dimple, or the like; and the internal peripheral side of the sliding surface 22 is provided with a negative pressure generating mechanism 28 composed of a reverse Rayleigh step mechanism, a modified reverse Rayleigh step mechanism, a reverse spiral groove, or the like. The effects achieved by this configuration are that there is no leakage when no motion is occurring, the frictional coefficient is low because the action of the external peripheral positive pressure generating mechanism 27 always takes place in a state of fluid lubrication including the beginning of rotation, and leakage can be reduced because the internal peripheral negative pressure generating mechanism 28 makes pumping possible from the low-pressure side to the high-pressure side. In cases in which the pressure release groove (not shown) of Embodiment 2 above is provided between the positive pressure generating mechanism 27 and the negative pressure generating mechanism 28, the dynamic pressure generated by the positive pressure generating mechanism 27 is released to the pressure of the high-pressure fluid, whereby the fluid does not flow into the low-pressure-side negative pressure generating mechanism 28, and loss of the negative pressure generating capability of the negative pressure generating mechanism can be prevented.

[Embodiment 5]

Figure 23:
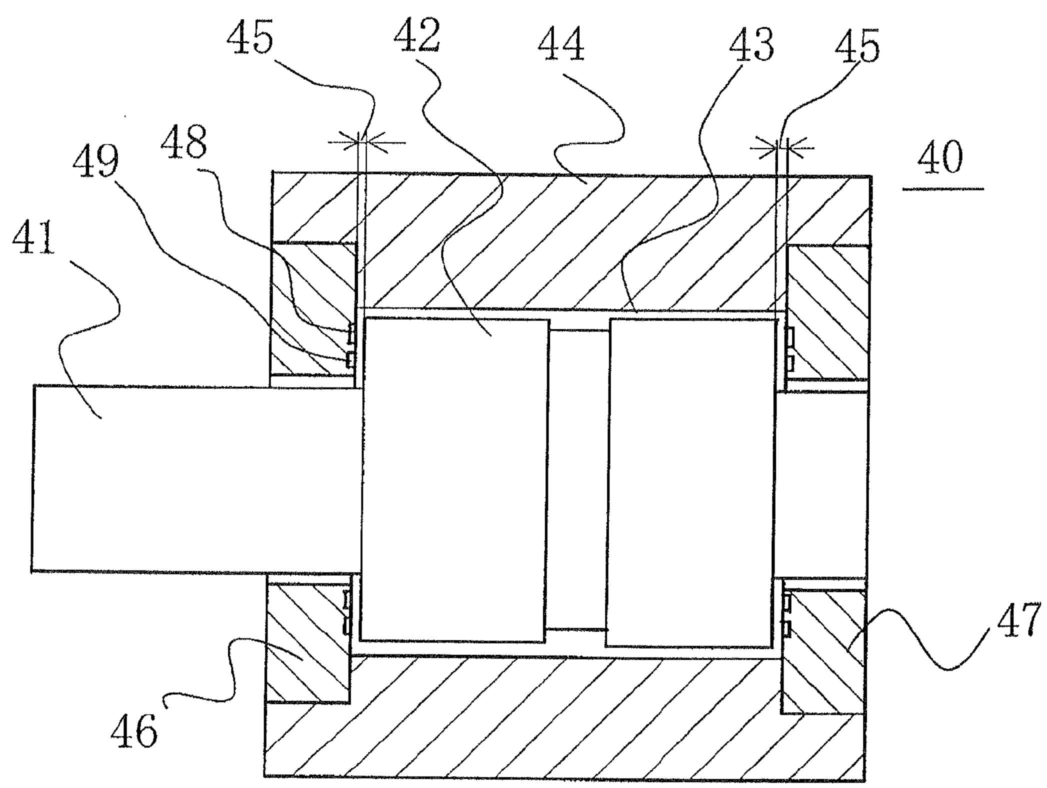
FIG. 23 is a cross-sectional view of a thrust bearing on which is mounted another sliding component paired with the sliding component, according to Embodiment 5 of the present invention.

FIG. 23 is a cross-sectional view of a thrust bearing on which is mounted another sliding component paired with the sliding component of the present invention.

The number 40 indicates an entire thrust bearing, which is basically configured from a cylindrical housing 44 which is disposed so as to enclose the external peripheral surface of an annular ridged protrusion 42 provided to a rotating shaft 41, and which has an internal peripheral surface that faces the external periphery of the ridged protrusion 42 via a minuscule radial-direction gap 43; and thrust receivers 46, 47 which extend inward in the radial direction from both ends of the housing 44 and which face the end surfaces of the ridged protrusion 42 via tiny gaps 45 in the thrust direction; the bearing body being configured by the housing 44 and the thrust receivers 46, 47.

The thrust receivers 46, 47 of the bearing body and the end surfaces of the ridged protrusion 42 are in rotatable slidable contact with each other in the axial direction. A lubricant is held by its own surface tension in the minuscule radial-direction gap 43 and the minuscule thrust-direction gaps 45.

Furthermore, the external peripheral sides of the sliding surfaces of the thrust receivers 46, 47 are provided with positive pressure generating mechanisms 48 composed of Rayleigh step mechanisms, modified Rayleigh step mechanisms, spiral grooves, dimples, or the like, and the internal peripheral sides of the sliding surfaces are provided with negative pressure generating mechanisms 49 composed of reverse Rayleigh step mechanisms, modified reverse Rayleigh step mechanisms, reverse spiral grooves, or the like.

The effects achieved by this configuration are that there is no leakage when no motion is occurring, the frictional coefficient is low because the action of the external peripheral positive pressure generating mechanisms 48 consistently takes place in a state of fluid lubrication including the beginning of rotation, and leakage can be reduced because the internal peripheral negative pressure generating mechanisms 49 make pumping possible from the low-pressure side to the high-pressure side.

In cases in which the pressure release grooves (not shown) of Embodiment 2 above are provided between the positive pressure generating mechanisms 48 and the negative pressure generating mechanisms 49, the dynamic pressure generated by the positive pressure generating mechanisms 48 is released to the pressure of the high-pressure fluid, whereby the fluid does not flow into the low-pressure-side negative pressure generating mechanisms 49, and loss of the negative pressure generating capability of the negative pressure generating mechanisms can be prevented.

KEY

1 Sliding component
2 Sliding surface
3 Positive pressure generating mechanism (Rayleigh step mechanism)
4 Negative pressure generating mechanism (reverse Rayleigh step mechanism)
5 Groove part of Rayleigh step mechanism
6 Groove part of reverse Rayleigh step mechanism
7 Shared radial-direction groove
8 Internal-peripheral-side seal surface
9 Rayleigh step
10 Opposing sliding component
11 Reverse Rayleigh step
12 Spiral groove
13 Dimple
14 Reverse spiral groove
15 Pressure release groove
16 Arrow indicating fluid-expelling direction
20 Mechanical seal
21 Fixing sealing ring
22 Sliding surface
23 Holding ring
24 O ring
25 Spring
26 Rotational sealing ring
27 Positive pressure generating mechanism
28 Negative pressure generating mechanism
29 Sliding surface
30 Housing
40 Thrust bearing
41 Rotating shaft
42 Ridged protrusion
43 Radial-direction gap
44 Housing
45 Tiny gap
46 Thrust receiver
47 Thrust receiver
48 Positive pressure generating mechanism
49 Negative pressure generating mechanism
50 Communication means
51 Radial-direction groove
52 Communication hole
53-56 Radial-direction grooves

The invention claimed is:

1. A sliding component characterized in that a positive pressure generating mechanism comprising a positive pressure generating groove is provided to an internal high-pressure peripheral side of one of two sliding surfaces that slide relative to each other in a pair of sliding components, a negative pressure generating mechanism comprising a negative pressure generating groove is provided to an external low-pressure peripheral side, and a pressure release groove is provided between said positive pressure generating groove and said negative pressure generating groove, said positive pressure generating groove, said pressure release groove, and said negative pressure generating groove being communicated with a high-pressure fluid side and separated from a low-pressure fluid side by a seal surface on the external peripheral side.

2. A sliding component according to claim 1, characterized in that said pressure release groove is provided to each of said two sliding surfaces so as to be positioned between said positive pressure generating groove and said negative pressure generating groove.

3. The sliding component according to claim 1, characterized in that the external-peripheral-side positive pressure generating mechanism is formed from a Rayleigh step mechanism, the internal-peripheral-side negative pressure generating mechanism is formed from a reverse Rayleigh step mechanism, and the pressure release groove is formed from a circular groove, said Rayleigh step mechanism, said reverse Rayleigh step mechanism, and said pressure release groove all being communicated with the high-pressure fluid side.

4. The sliding component according to claim 3, characterized in that pluralities of Rayleigh step mechanisms n and pluralities of reverse Rayleigh step mechanisms n are provided in parallel in a circumferential direction to either side of the pressure release groove so as to constitute pairs, and an upstream end of a groove part of an $n^{th}$ Rayleigh step mechanism and a downstream end of a groove part of an $n-1^{th}$ reverse Rayleigh step mechanism are formed so as to substantially coincide in a position in the circumferential direction as seen from the upstream side, both groove parts and the pressure release groove being connected with the high-pressure fluid side via a shared communication groove.

5. The sliding component according to claim 3, characterized in that said plurality of reverse Rayleigh step mechanisms are provided in a radial direction.

6. The sliding component according to claim 1, characterized in that the width of the internal-peripheral-side seal surface can be varied.

7. The sliding component according to claim 1, characterized in that a radial-direction groove is shaped so as to be slanted from the internal peripheral side communicated with the negative pressure generating mechanism to the external peripheral side in the rotational direction of the counterpart sliding surface.

8. A sliding component characterized in that an external peripheral side of a pair of sliding components is a high-pressure fluid side, an internal peripheral side is a low-pressure fluid side, a positive pressure generating mechanism comprising a positive pressure generating groove is provided to a high-pressure side of a sliding surface of a stationary-side sliding component, a negative pressure generating mechanism comprising a negative pressure generating groove is provided to a low-pressure side of a sliding surface of a rotating-side sliding component, and a pressure release groove is provided to each of said stationary-side and rotating-side sliding surfaces so as to be positioned between said positive pressure generating groove and said negative pressure generating groove, said positive pressure generating groove, said pressure release grooves, and said negative pressure generating groove being communicated with the high-pressure fluid side and separated from the low-pressure fluid Side by a seal surface on the external peripheral side.

9. A sliding component characterized in that a pair of sliding components comprise annular bodies, an external peripheral side of the annular bodies is a high-pressure fluid side and an internal peripheral side is a low-pressure fluid side, a positive pressure generating mechanism comprising a positive pressure generating groove is provided to a high-pressure side of a sliding surface on one side of the annular body, a negative pressure generating mechanism comprising a negative pressure generating groove is provided to a low-pressure side, and a pressure release groove is provided between said positive pressure generating groove and said negative pressure generating groove, said positive pressure generating groove, said pressure release groove, and said negative pressure generating groove being communicated with the high-pressure fluid side and separated from the low-pressure fluid side by a seal surface on the external peripheral side.

10. A sliding component according to claim 9, characterized in that said positive pressure generating mechanism comprising a positive pressure generating groove is provided to a high-pressure side in a stationary-side sliding surface of the annular body, said negative pressure generating mechanism comprising a negative pressure generating groove is provided to a low-pressure side of a rotating-side sliding surface of the annular body, and a pressure release groove is provided to said stationary-side and rotating-side sliding surfaces so as to be positioned between said positive pressure generating groove and said negative pressure generating groove, said positive pressure, generating groove, said pressure release grooves, and said negative pressure generating groove being communicated with the high-pressure fluid side and separated from the low-pressure fluid side by a seal surface on the external peripheral side.

* * * * *